United States Patent
Moriguchi

(10) Patent No.: US 11,982,532 B1
(45) Date of Patent: May 14, 2024

(54) AZIMUTH/ATTITUDE ANGLE MEASURING DEVICE

(71) Applicant: Sumitomo Precision Products Co., Ltd., Amagasaki (JP)

(72) Inventor: Takafumi Moriguchi, Amagasaki (JP)

(73) Assignee: Sumitomo Precision Products Co., Ltd., Amagasaki (JP)

(*) Notice: Subject to any disclaimer, the term of this patent is extended or adjusted under 35 U.S.C. 154(b) by 119 days.

(21) Appl. No.: 17/950,250

(22) Filed: Sep. 22, 2022

Related U.S. Application Data

(63) Continuation of application No. PCT/JP2021/011917, filed on Mar. 23, 2021.

(30) Foreign Application Priority Data

Mar. 24, 2020 (JP) .................................. 2020-052443

(51) Int. Cl.
*G01C 19/5776* (2012.01)
*G01C 21/16* (2006.01)

(52) U.S. Cl.
CPC ......... *G01C 19/5776* (2013.01); *G01C 21/16* (2013.01)

(58) Field of Classification Search
CPC ............................ G01C 19/5776; G01C 21/16
See application file for complete search history.

(56) References Cited

U.S. PATENT DOCUMENTS

2016/0377433 A1  12/2016  Moriguchi

FOREIGN PATENT DOCUMENTS

| JP | 2009-115559 A | 5/2009 |
| JP | 6761140 B1 | 9/2020 |

OTHER PUBLICATIONS

International Search Report (PCT/ISA/210) issued in PCT Application No. PCT/JP2021/011917 dated Jun. 15, 2021 with English translation (four (4) pages).
Japanese-language Written Opinion (PCT/ISA/237) issued in PCT Application No. PCT/JP2021/011917 dated Jun. 15, 2021 (four (4) pages).

*Primary Examiner* — David J Bolduc
(74) *Attorney, Agent, or Firm* — Crowell & Moring LLP

(57) ABSTRACT

An azimuth/attitude angle measuring device (100) includes an angular velocity sensor (103a) and a control unit (101). The angular velocity sensor includes a vibrator (11), a primary side control circuit (12), and a secondary side control circuit (13). The control unit is configured to perform control for switching a state of the angular velocity sensor between a first state in which the angular velocity is detected by interchanging a function of the primary side control circuit and a function of the secondary side control circuit and a se cond state in which the angular velocity is detected without the function of the primary side control circuit and the function of the secondary side control circuit being interchanged.

18 Claims, 8 Drawing Sheets

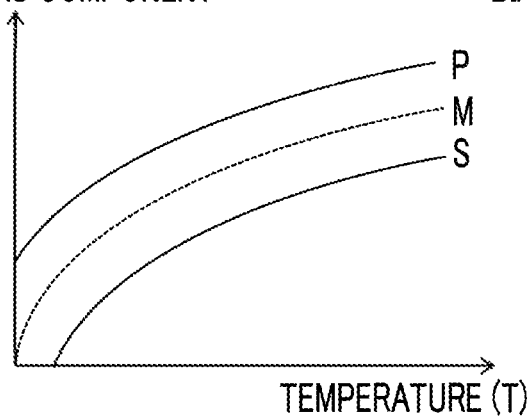
FIG. 9A
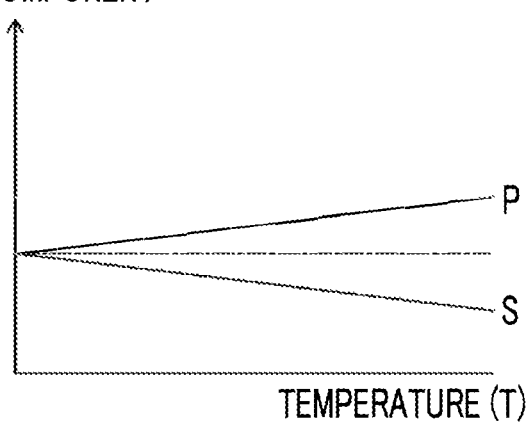
FIG. 9B
FIG. 10
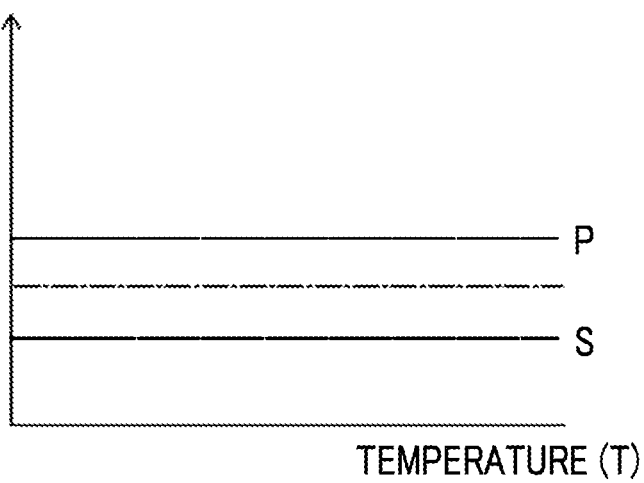

AZIMUTH/ATTITUDE ANGLE MEASURING DEVICE

TECHNICAL FIELD

The present invention relates to an azimuth/attitude angle measuring device, and more particularly to an azimuth/attitude angle measuring device including an angular velocity sensor.

BACKGROUND ART

In the related art, an electronic device provided with an angular velocity sensor is known. Such an electronic device is disclosed in, for example, Japanese Unexamined Patent Publication No. 2009-115559.

Japanese Unexamined Patent Publication No. 2009-115559 discloses an electronic device including an angular velocity sensor and a substrate on which the angular velocity sensor is placed. The angular velocity sensor includes an element portion having a ring shape and a plurality of electrodes disposed in a circumferential shape on the radial outer side of the element portion having a ring shape. The plurality of electrodes include a primary electrode and a secondary electrode. An AC power supply that generates primary vibration in the element portion having a ring shape by applying an AC voltage to one of the primary electrode and the secondary electrode is connected to one of the primary electrode and the secondary electrode. Further, detection means for detecting the magnitude of an electric signal generated in the other of the primary electrode and the secondary electrode is connected to the other of the primary electrode and the secondary electrode. In the angular velocity sensor, an angular velocity is operated based on a change in the magnitude of the electric signal detected by the detection means.

Further, the angular velocity sensor is configured to switch between connection states of the AC power supply and the detection means to a first state in which the AC power supply is connected to the primary electrode and the detection means is connected to the secondary electrode and a second state in which the AC power supply is connected to the secondary electrode and the detection means is connected to the primary electrode. The angular velocity sensor is configured to cancel the bias component of the angular velocity sensor by differentiating the outputs of the angular velocity sensor before and after switching. Note that, the bias component is an error from a zero point output from the angular velocity sensor even in a state in which the angular velocity is not applied, and is generated due to the asymmetry or the like of a gyro element included in the vibration-type angular velocity sensor.

The angular velocity sensor described in Japanese Unexamined Patent Publication No. 2009-115559 is configured to detect the angular velocity by interchanging the function of a primary side and the function of a secondary side.

CITATION LIST

Patent Literature

[PTL 1] Japanese Unexamined Patent Publication No. 2009-115559

SUMMARY OF INVENTION

Technical Problem

However, in the angular velocity sensor disclosed in Japanese Unexamined Patent Publication No. 2009-115559, the angular velocity is detected by interchanging the function of the primary side and the function of the secondary side, so that it is not possible to detect the angular velocity, for example, at a timing of interchanging the function of the primary side and the function of the secondary side. As a result, the detection of the angular velocity becomes intermittent. Even in a case where the detection of the angular velocity becomes intermittent, it is possible to accurately detect the angular velocity in a stationary state. However, in a case where the detection of the angular velocity becomes intermittent, it is difficult to accurately (continuously) detect the angular velocity in a motion state in which the angular velocity tends to change with time. Therefore, as in the angular velocity sensor disclosed in Japanese Unexamined Patent Publication No. 2009-115559, when using an angular velocity sensor in which the function of the primary side and the function of the secondary side are interchangeable, it is desired to accurately detect both the angular velocity in the stationary state and the angular velocity in the motion state.

The present invention has been made to solve the above-mentioned problems, and one object of the present invention is to provide an azimuth/attitude angle measuring device that is capable of accurately detecting both an angular velocity in a stationary state and an angular velocity in a motion state even when using an angular velocity sensor in which the function of a primary side control circuit and the function of a secondary side control circuit are interchangeable.

Solution to Problem

In order to achieve the above object, according to a first aspect of the present invention, there is provided an azimuth/attitude angle measuring device including: a first angular velocity sensor; and a control unit, in which the first angular velocity sensor includes a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, the primary side control circuit and the secondary side control circuit are configured so that a function as the primary side control circuit and a function as the secondary side control circuit are interchangeable, and the control unit is configured to perform control for switching a state of the first angular velocity sensor between a first state in which the angular velocity is detected while repeatedly interchanging the function of the primary side control circuit and the function of the secondary side control circuit and a second state in which the angular velocity is detected without the function of the primary side control circuit and the function of the secondary side control circuit being interchanged.

In the azimuth/attitude angle measuring device according to the first aspect of the present invention, as described above, the control unit is configured to perform control for switching the state of the first angular velocity sensor between the first state in which the angular velocity is detected while repeatedly interchanging the function of the primary side control circuit and the function of the secondary side control circuit and the second state in which the angular velocity is detected without the function of the primary side control circuit and the function of the secondary side control circuit being interchanged. As a result, when detecting the angular velocity in a stationary state, it is possible to switch the state of the first angular velocity sensor to the first state by the control unit. As a result, in the first state, it is possible to detect the angular velocity in the stationary state by interchanging the function of the primary side control circuit and the function of the secondary side control circuit, so that it is possible to detect the angular velocity while cancelling the bias component of the first angular velocity sensor. As a result, it is possible to accurately detect the angular velocity in the stationary state. Further, when detecting the angular velocity in the motion state, it is possible to switch the state of the first angular velocity sensor to the second state by the control unit. As a result, in the second state, it is possible to detect the angular velocity in the motion state without the function of the primary side control circuit and the function of the secondary side control circuit being interchanged. Therefore, it is possible to prevent the inconvenience in which it is not possible to detect the angular velocity, for example, at a timing of interchanging the function of the primary side control circuit and the function of the secondary side control circuit. As a result, it is possible to prevent the detection of the angular velocity from becoming intermittent. Therefore, even when using the first angular velocity sensor in which the function of the primary side control circuit and the function of the secondary side control circuit are interchangeable, it is possible to accurately (continuously) detect the angular velocity in the motion state. As a result, even when using the first angular velocity sensor in which the function of the primary side control circuit and the function of the secondary side control circuit are interchangeable, it is possible to provide an azimuth/attitude angle measuring device which is capable of accurately detecting both the angular velocity in the stationary state and the angular velocity in the motion state.

In the azimuth/attitude angle measuring device according to the first aspect, preferably, the first angular velocity sensor further includes a plurality of switch elements, and the control unit is configured to perform control for interchanging the function of the primary side control circuit and the function of the secondary side control circuit by an operation of switching the plurality of switch elements in the first state, and not interchanging the function of the primary side control circuit and the function of the secondary side control circuit by not performing the operation of switching the plurality of switch elements in the second state. With this configuration, it is possible to switch the state of the first angular velocity sensor between the first state and the second state by simply controlling the operation of switching the plurality of switch elements, so that it is possible to more simply control the state of the first angular velocity sensor by the control unit.

In the azimuth/attitude angle measuring device according to the first aspect, preferably, the control unit is configured to perform control for switching at least one of a detection range and a frequency band of the first angular velocity sensor in a stationary state and a motion state. Here, the required detection range and frequency band are different between the case of detecting the angular velocity in the stationary state and the case of detecting the angular velocity in the motion state. Specifically, when detecting the angular velocity in the stationary state, a small detection range and a small frequency band are required in order to reduce noise. Further, when detecting the angular velocity in the motion state, the detected angular velocity is large and the change is rapid, so that a large detection range and a large frequency band are required. Therefore, as described above, when at least one of the detection range and the frequency band of the first angular velocity sensor is switched in the stationary state and the motion state, it is possible to switch at least one of the detection range and the frequency band between a state in which the angular velocity is detected in the stationary state and a state in which the angular velocity is detected in the motion state, so that it is possible to more accurately detect both the angular velocity in the stationary state and the angular velocity in the motion state.

In this case, preferably, the secondary side control circuit has a drive circuit that constitutes the closed control loop and includes a first amplifier circuit and a second amplifier circuit that amplifies the output from the closed control loop, and the control unit is configured to perform control for switching the detection range and the frequency band of the first angular velocity sensor by switching an amplification rate of the first amplifier circuit out of the first amplifier circuit and the second amplifier circuit in the stationary state and the motion state. Here, the S/N ratio of the output of the first angular velocity sensor is basically determined based on a signal and noise generated in the closed control loop and an input noise generated in the second amplifier circuit. In this case, when the detection range and the frequency band of the first angular velocity sensor are switched by switching the amplification rate of the second amplifier circuit, a ratio of the signal and noise generated in the closed control loop and the input noise generated in the second amplifier circuit does not change, so that the S/N ratio of the output of the first angular velocity sensor does not change. On the other hand, as described above, when switching the detection range and frequency band of the first angular velocity sensor by switching the amplification rate of the first amplifier circuit in the first amplifier circuit and the second amplifier circuit, it is possible to change the signal and the noise generated in the closed control loop unlike the case of switching the amplification rate of the second amplifier circuit. Therefore, when the signal and the noise generated in the closed control loop are increased, it is possible to cause the input noise generated in the second amplifier circuit to be relatively smaller than the signal and the noise generated in the closed control loop. As a result, it is possible to switch the detection range and the frequency band of the first angular velocity sensor while improving the S/N ratio of the output of the first angular velocity sensor.

In the azimuth/attitude angle measuring device according to the first aspect, preferably, the control unit is configured to perform control for switching an offset value for correcting fluctuation of a sensor output due to a temperature change in the first state and the second state. Here, the appropriate offset value differs between the case where the function of the primary side control circuit and the function of the secondary side control circuit are interchanged and the case where the function of the primary side control circuit and the function of the secondary side control circuit are not interchanged. Therefore, as described above, when the offset value for correcting fluctuation of the sensor output due to the temperature change is switched between the first state and the second state, it is possible to switch the offset value for correcting the fluctuation of the sensor output due to the temperature change between the first state in which the function of the primary side control circuit and the function of the secondary side control circuit are interchanged and the second state in which the function of the primary side control circuit and the function of the secondary side control circuit are not interchanged, so that it is possible to accurately correct the fluctuation of the sensor output due to the temperature change in both the first state and the second state. As a result, it is possible to more accurately detect both the angular velocity in the stationary state and the angular velocity in the motion state.

The azimuth/attitude angle measuring device according to the first aspect, preferably, further includes a second angular velocity sensor that includes the vibrator, the primary side control circuit, and the secondary side control circuit, in which the control unit is configured to perform control for, in the second state, detecting the angular velocity without the function of the primary side control circuit and the function of the secondary side control circuit in the first angular velocity sensor being interchanged in a predetermined period, detecting the angular velocity while repeatedly interchanging the function of the primary side control circuit and the function of the secondary side control circuit in the second angular velocity sensor, and acquiring a bias component of the first angular velocity sensor based on an angular velocity detection result by the first angular velocity sensor and an angular velocity detection result by the second angular velocity sensor. With this configuration, the function of the primary side control circuit and the function of the secondary side control circuit are not interchanged. Therefore, even in a case of the first angular velocity sensor in the second state in which it is not possible to obtain the effect of cancelling the bias component by interchanging the functions, it is possible to acquire and cancel the bias component using the second angular velocity sensor. As a result, it is possible to more accurately detect the angular velocity in the motion state.

The azimuth/attitude angle measuring device according to the first aspect is, preferably, further includes a second angular velocity sensor that includes the vibrator, the primary side control circuit, and the secondary side control circuit, in which the control unit is configured to perform control for, in the first state, detecting the angular velocity while repeatedly interchanging the function of the primary side control circuit and the function of the secondary side control circuit in the first angular velocity sensor in a predetermined period, detecting the angular velocity without the function of the primary side control circuit and the function of the secondary side control circuit in the second angular velocity sensor being interchanged, and acquiring a bias component of the second angular velocity sensor based on an angular velocity detection result by the first angular velocity sensor and an angular velocity detection result by the second angular velocity sensor. With this configuration, the function of the primary side control circuit and the function of the secondary side control circuit are not interchanged. Therefore, even in a case of the second angular velocity sensor in which it is not possible to obtain the effect of cancelling the bias component by interchanging the functions, it is possible to acquire and cancel the bias component using the first angular velocity sensor. As a result, it is possible to more accurately detect the angular velocity in the motion state.

The azimuth/attitude angle measuring device according to the first aspect, preferably, further includes a third angular velocity sensor that includes the vibrator, the primary side control circuit, and the secondary side control circuit; and a power supply unit that supplies power to the first angular velocity sensor and the third angular velocity sensor, in which the control unit is configured so that, when the angular velocity for an operation is detected by one of the first angular velocity sensor and the third angular velocity sensor in both the first state and the second state, the control unit does not interchange the function of the primary side control circuit and the function of the secondary side control circuit in the other of the first angular velocity sensor and the third angular velocity sensor. Here, when the function of the primary side control circuit and the function of the second-ary side control circuit are interchanged, the current consumption of the angular velocity sensor fluctuates greatly from a steady state, so that so that there is a case where the output of the angular velocity sensor connected to the common power supply unit is influenced. Therefore, as described above, when the angular velocity is detected by one of the first angular velocity sensor and the third angular velocity sensor and the function of the primary side control circuit and the function of the secondary side control circuit are not interchanged by the other of the first angular velocity sensor and the third angular velocity sensor, it is possible to prevent the output of the angular velocity sensor connected to the common power supply unit from being influenced due to the interchange of the function of the primary side control circuit and the function of the secondary side control circuit.

The azimuth/attitude angle measuring device according to the first aspect is, preferably, configured to function as a gyro compass in the first state and function as an inertial navigation device in the second state. With this configuration, it is possible to cause the azimuth/attitude angle measuring device of the present invention to easily function as the gyro compass and the inertial navigation device. Therefore, it is possible to use the azimuth/attitude angle measuring device for the purpose of both the gyro compass and the inertial navigation device.

According to a second aspect of the present invention, there is provided an azimuth/attitude angle measuring device including a first angular velocity sensor; and a control unit, in which the first angular velocity sensor includes a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, the first angular velocity sensor is configured so that a function of inducing the primary vibration and a function of detecting the secondary vibration are interchangeable, and the control unit is configured to perform control for switching a state of the first angular velocity sensor between a first state in which the angular velocity is detected while repeatedly interchanging the function of inducing the primary vibration and the function of detecting the secondary vibration and a second state in which the angular velocity is detected without the function of inducing the primary vibration and the function of detecting the secondary vibration being interchanged.

As described above, the azimuth/attitude angle measuring device according to the second aspect of the present invention is configured to perform control for switching the state of the first angular velocity sensor between the first state in which the angular velocity is detected while repeatedly interchanging the function of inducing the primary vibration and the function of detecting the secondary vibration and the second state in which the angular velocity is detected without the function of inducing the primary vibration and the function of detecting the secondary vibration being interchanged. As a result, when detecting the angular velocity in a stationary state, it is possible to switch the state of the first angular velocity sensor to the first state by the control unit. As a result, in the first state, it is possible to detect the angular velocity in the stationary state by interchanging the function of inducing the primary vibration and the function of detecting the secondary vibration, so that it is possible to detect the angular velocity while cancelling the bias component of the first angular velocity sensor. As a result, it is possible to accurately detect the angular velocity in the stationary state. Further, when detecting the angular velocity in the motion state, it is possible to switch the state of the first angular velocity sensor to the second state by the control unit. As a result, in the second state, it is possible to detect the angular velocity in the motion state without the function of inducing the primary vibration and the function of detecting the secondary vibration being interchanged. Therefore, it is possible to prevent the inconvenience in which it is not possible to detect the angular velocity, for example, at the timing of interchanging the function of inducing the primary vibration and the function of detecting the secondary vibration. As a result, it is possible to prevent the detection of the angular velocity from becoming intermittent. Therefore, even when using the first angular velocity sensor in which the function of inducing the primary vibration and the function of detecting the secondary vibration are interchangeable, it is possible to accurately (continuously) detect the angular velocity in the motion state. As a result, even when using the first angular velocity sensor in which the function of inducing the primary vibration and the function of detecting the secondary vibration are interchangeable, it is possible to provide an azimuth/attitude angle measuring device capable of accurately detecting both the angular velocity in the stationary state and the angular velocity in the motion state.

In the azimuth/attitude angle measuring device according to the second aspect, preferably, the first angular velocity sensor further includes a plurality of switch elements, and the control unit is configured to perform control for interchanging the function of inducing the primary vibration and the function of detecting the secondary vibration by an operation of switching the plurality of switch elements in the first state, and not interchanging the function of inducing the primary vibration and the function of detecting the secondary vibration by not performing the operation of switching the plurality of switch elements in the second state. With this configuration, it is possible to switch the state of the first angular velocity sensor between the first state and the second state by simply controlling the operation of switching the plurality of switch elements, so that it is possible to more simply control the state of the first angular velocity sensor by the control unit.

In the azimuth/attitude angle measuring device according to the second aspect, preferably, the control unit is configured to perform control for switching at least one of a detection range and a frequency band of the first angular velocity sensor in a stationary state and a motion state. Here, the required detection range and frequency band are different between the case of detecting the angular velocity in the stationary state and the case of detecting the angular velocity in the motion state. Specifically, when detecting the angular velocity in the stationary state, a small detection range and a small frequency band are required in order to reduce noise. Further, when detecting the angular velocity in the motion state, the detected angular velocity is large and the change is rapid, so that a large detection range and a large frequency band are required. Therefore, as described above, when at least one of the detection range and the frequency band of the first angular velocity sensor is switched in the stationary state and the motion state, it is possible to switch at least one of the detection range and the frequency band between a state in which the angular velocity is detected in the stationary state and a state in which the angular velocity is detected in the motion state, so that it is possible to more accurately detect both the angular velocity in the stationary state and the angular velocity in the motion state.

In this case, preferably, the secondary side control circuit has a drive circuit that constitutes the closed control loop and includes a first amplifier circuit and a second amplifier circuit that amplifies the output from the closed control loop, and the control unit is configured to perform control for switching the detection range and the frequency band of the first angular velocity sensor by switching an amplification rate of the first amplifier circuit out of the first amplifier circuit and the second amplifier circuit in the stationary state and the motion state. Here, the S/N ratio of the output of the first angular velocity sensor is basically determined based on a signal and noise generated in the closed control loop and an input noise generated in the second amplifier circuit. In this case, when the detection range and the frequency band of the first angular velocity sensor are switched by switching the amplification rate of the second amplifier circuit, a ratio of the signal and noise generated in the closed control loop and the input noise generated in the second amplifier circuit does not change, so that the S/N ratio of the output of the first angular velocity sensor does not change. On the other hand, as described above, when switching the detection range and frequency band of the first angular velocity sensor by switching the amplification rate of the first amplifier circuit in the first amplifier circuit and the second amplifier circuit, it is possible to change the signal and the noise generated in the closed control loop unlike the case of switching the amplification rate of the second amplifier circuit. Therefore, when the signal and the noise generated in the closed control loop are increased, it is possible to cause the input noise generated in the second amplifier circuit to be relatively smaller than the signal and the noise generated in the closed control loop. As a result, it is possible to switch the detection range and the frequency band of the first angular velocity sensor while improving the S/N ratio of the output of the first angular velocity sensor.

In the azimuth/attitude angle measuring device according to the second aspect, preferably, the control unit is configured to perform control for switching an offset value for correcting fluctuation of a sensor output due to a temperature change in the first state and the second state. Here, an appropriate offset value differs between the case where the function of inducing the primary vibration and the function of detecting the secondary vibration are interchanged, and the case where the function of inducing the primary vibration and the function of detecting the secondary vibration are not interchanged. Therefore, as described above, when the offset value for correcting fluctuation of the sensor output due to the temperature change is switched between the first state and the second state, it is possible to switch the offset value for correcting the fluctuation of the sensor output due to the temperature change between the first state in which the function of the primary side control circuit and the function of the secondary side control circuit are interchanged and the second state in which the function of the primary side control circuit and the function of the secondary side control circuit are not interchanged, so that it is possible to accurately correct the fluctuation of the sensor output due to the temperature change in both the first state and the second state. As a result, it is possible to more accurately detect both the angular velocity in the stationary state and the angular velocity in the motion state.

The azimuth/attitude angle measuring device according to the second aspect, preferably, further includes a second angular velocity sensor that includes the vibrator, the primary side control circuit, and the secondary side control circuit, in which the control unit is configured to perform control for, in the second state, detecting the angular velocity without the function of inducing the primary vibration of the first angular velocity sensor and the function of detecting the secondary vibration in the first angular velocity sensor being interchanged in a predetermined period, detecting the angular velocity while repeatedly interchanging the function of inducing the primary vibration and the function of detecting the secondary vibration in the second angular velocity sensor, and acquiring a bias component of the first angular velocity sensor based on an angular velocity detection result by the first angular velocity sensor and an angular velocity detection result by the second angular velocity sensor. With this configuration, the function of inducing the primary vibration and the function of detecting the secondary vibration are not interchanged. Therefore, even in a case of the first angular velocity sensor in the second state in which it is not possible to obtain the effect of cancelling the bias component by interchanging the functions, it is possible to acquire and cancel the bias component using the second angular velocity sensor. As a result, it is possible to more accurately detect the angular velocity in the motion state.

The azimuth/attitude angle measuring device according to the second aspect, preferably, further includes a second angular velocity sensor that includes the vibrator, the primary side control circuit, and the secondary side control circuit, in which the control unit is configured to perform control for, in the first state, detecting the angular velocity while repeatedly interchanging the function of inducing the primary vibration and the function of detecting the secondary vibration in the first angular velocity sensor in a predetermined period, detecting the angular velocity without the function of inducing the primary vibration and the function of detecting the secondary vibration in the second angular velocity sensor being interchanged, and acquiring a bias component of the second angular velocity sensor based on an angular velocity detection result by the first angular velocity sensor and an angular velocity detection result by the second angular velocity sensor. With this configuration, the function of inducing the primary vibration and the function of detecting the secondary vibration are not interchanged. Therefore, even in a case of the second angular velocity sensor in which it is not possible to obtain the effect of cancelling the bias component by interchanging the functions, it is possible to acquire and cancel the bias component using the first angular velocity sensor. As a result, it is possible to more accurately detect the angular velocity in the motion state.

The azimuth/attitude angle measuring device according to the second aspect, preferably, further includes a third angular velocity sensor that includes the vibrator, the primary side control circuit, and the secondary side control circuit; and a power supply unit that supplies power to the first angular velocity sensor and the third angular velocity sensor, in which the control unit is configured so that, when the angular velocity for an operation is detected by one of the first angular velocity sensor and the third angular velocity sensor in both the first state and the second state, the control unit does not interchange the function of inducing the primary vibration and the function of detecting the secondary vibration in the other of the first angular velocity sensor and the third angular velocity sensor. Here, when the function of inducing the primary vibration and the function of detecting the secondary vibration are interchanged, the current consumption of the angular velocity sensor fluctuates greatly from the steady state, so that there is a case where the output of the angular velocity sensor connected to the common power supply unit is influenced. Therefore, as described above, when the angular velocity is detected by one of the first angular velocity sensor and the third angular velocity sensor and the function of inducing the primary vibration and the function of detecting the secondary vibration are not interchanged by the other of the first angular velocity sensor and the third angular velocity sensor, it is possible to prevent the output of the angular velocity sensor connected to the common power supply unit from being influenced due to the interchange of the function of inducing the primary vibration and the function of detecting the secondary vibration.

The azimuth/attitude angle measuring device according to the second aspect is, preferably, configured to function as a gyro compass in the first state and function as an inertial navigation device in the second state. With this configuration, it is possible to cause the azimuth/attitude angle measuring device of the present invention to easily function as the gyro compass and the inertial navigation device. Therefore, it is possible to use the azimuth/attitude angle measuring device for the purpose of both the gyro compass and the inertial navigation device.

Advantageous Effects of Invention

According to the present invention, as described above, even when using an angular velocity sensor in which the function of a primary side control circuit and the function of a secondary side control circuit are interchangeable, it is possible to accurately detect both an angular velocity in a stationary state and an angular velocity in a motion state.

BRIEF DESCRIPTION OF DRAWINGS

FIG. 9A is a diagram (2) showing the relationship between temperature after the correction of the sensor output by the offset value and the bias component. FIG. 9B is a diagram (3) showing the relationship between temperature after the correction of the sensor output by the offset value and the bias component.

FIG. 10 is a diagram (3) showing the relationship between temperature after the correction of the sensor output by the offset value and the bias component.

DESCRIPTION OF EMBODIMENTS

Hereinafter, an embodiment of the present invention will be described with reference to the drawings.

The configuration of an azimuth/attitude angle measuring device 100 according to one embodiment will be described with reference to FIGS. 1 to 12.

The azimuth/attitude angle measuring device 100 is configured to detect an azimuth angle and an attitude angle. Specifically, the azimuth/attitude angle measuring device 100 is configured to detect angular velocities around an X axis, a Y axis, and a Z axis orthogonal to each other, respectively, and detect three-dimensional azimuth angles and attitude angles based on the detected angular velocities.

Figure 1:
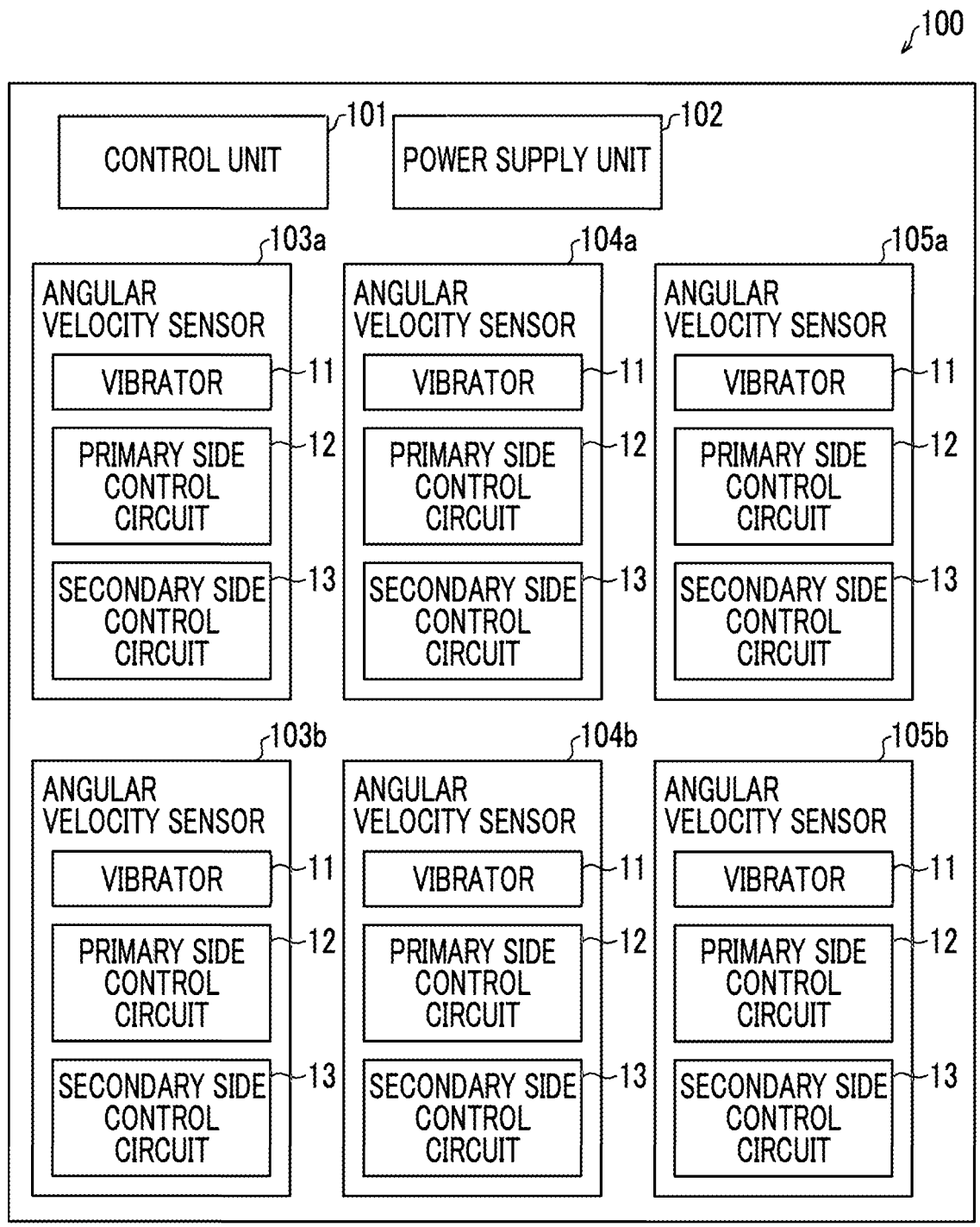
FIG. 1 is a block diagram showing a configuration of an azimuth/attitude angle measuring device according to an embodiment.

As shown in FIG. 1, the azimuth/attitude angle measuring device 100 includes a control unit 101, a power supply unit 102, an angular velocity sensor 103a, an angular velocity sensor 103b, an angular velocity sensor 104a, an angular velocity sensor 104b, an angular velocity sensor 105a, and an angular velocity sensor 105b. The angular velocity sensors 103a and 103b, the angular velocity sensors 104a and 104b, and the angular velocity sensors 105a and 105b are configured to detect angular velocities around axes intersecting each other. Further, the angular velocity sensors 103a and 103b are configured to detect an angular velocity around axes parallel to or coaxial with each other. Further, the angular velocity sensors 104a and 104b are configured to detect an angular velocity around axes parallel to or coaxial with each other. Further, the angular velocity sensors 105a and 105b are configured to detect an angular velocity around axes parallel to or coaxial with each other.

Figure 2:
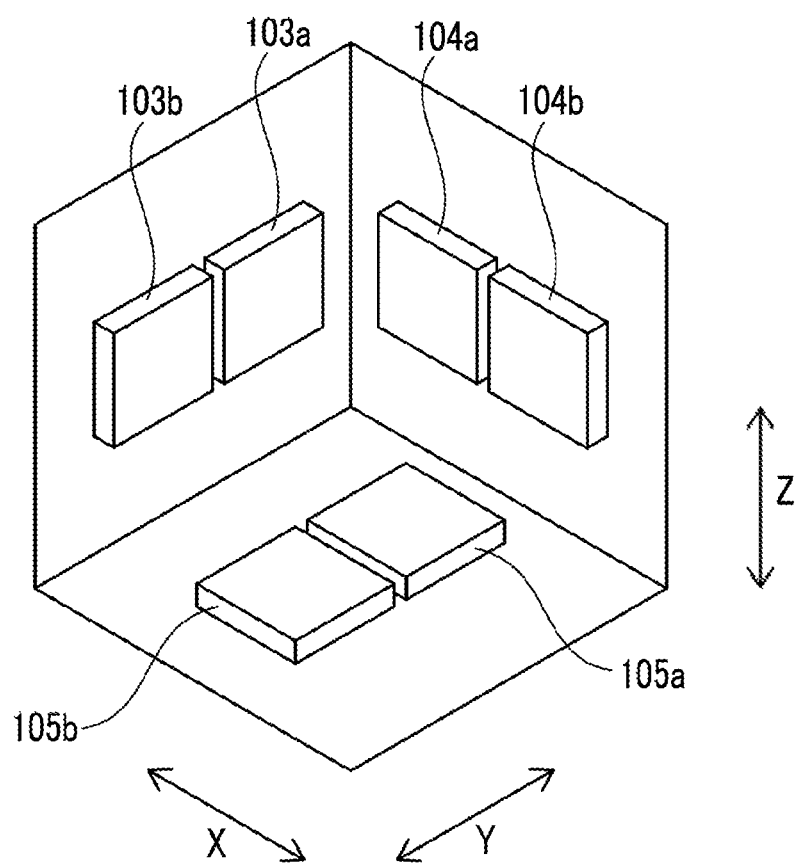
FIG. 2 is a perspective view showing a plurality of angular velocity sensors of the azimuth/attitude angle measuring device according to the embodiment.

Specifically, as shown in FIG. 2, the angular velocity sensors 103a and 103b are configured to detect the angular velocity around the X axis. Further, the angular velocity sensors 104a and 104b are configured to detect the angular velocity around the Y axis. Further, the angular velocity sensors 105a and 105b are configured to detect the angular velocity around the Z axis. The angular velocity sensors 103a and 103b are disposed adjacent to each other. Further, the angular velocity sensors 104a and 104b are disposed adjacent to each other. Further, the angular velocity sensors 105a and 105b are disposed adjacent to each other. Note that, the angular velocity sensor 103a is an example of a "first angular velocity sensor" in the claims. Further, the angular velocity sensor 103b is an example of a "second angular velocity sensor" in the claims. Further, the angular velocity sensor 104a is an example of a "third angular velocity sensor" in the claims. Further, the angular velocity sensor 105a is an example of the "third angular velocity sensor" in the claims.

The control unit 101 is configured to control each unit of the azimuth/attitude angle measuring device 100. The control unit 101 includes a Central Processing Unit (CPU) and a memory.

The power supply unit 102 is configured to supply power to each unit of the azimuth/attitude angle measuring device 100. Specifically, the power supply unit 102 is configured to supply power to the angular velocity sensors 103a, 103b, 104a, 104b, 105a, and 105b. Further, the power supply unit 102 is configured to supply AC power to the angular velocity sensors 103a, 103b, 104a, 104b, 105a, and 105b. The power supply unit 102 is configured to be supplied with power from an external power source or a battery provided in the azimuth/attitude angle measuring device 100. For example, the power supply unit 102 is a power conversion circuit that converts the supplied power. The power supply unit 102 includes a switching element, a capacitor, a diode, and the like.

As shown in FIG. 1, each of the angular velocity sensors 103a, 103b, 104a, 104b, 105a, and 105b has a vibrator 11, a primary side control circuit 12 that has a closed control loop, the output of the closed control loop inducing primary vibration in the vibrator 11, and a secondary side control circuit 13 that has a closed control loop which detects secondary vibration generated in the vibrator 11 due to an angular velocity applied to the vibrator 11. The vibrator 11 includes a ring-type vibrator.

Figure 3:
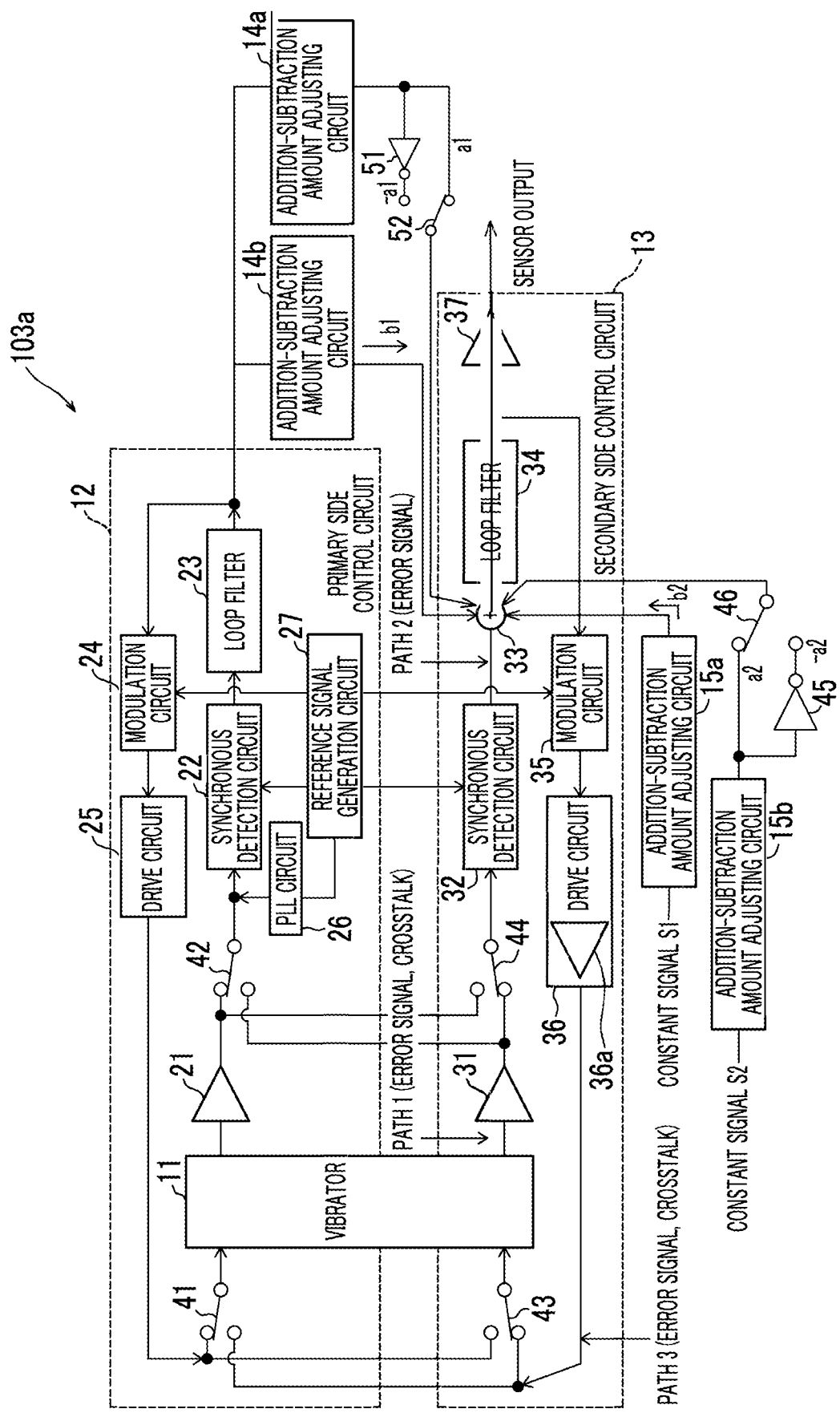
FIG. 3 is a block diagram showing a circuit configuration of the angular velocity sensor according to the embodiment.
Figure 4:
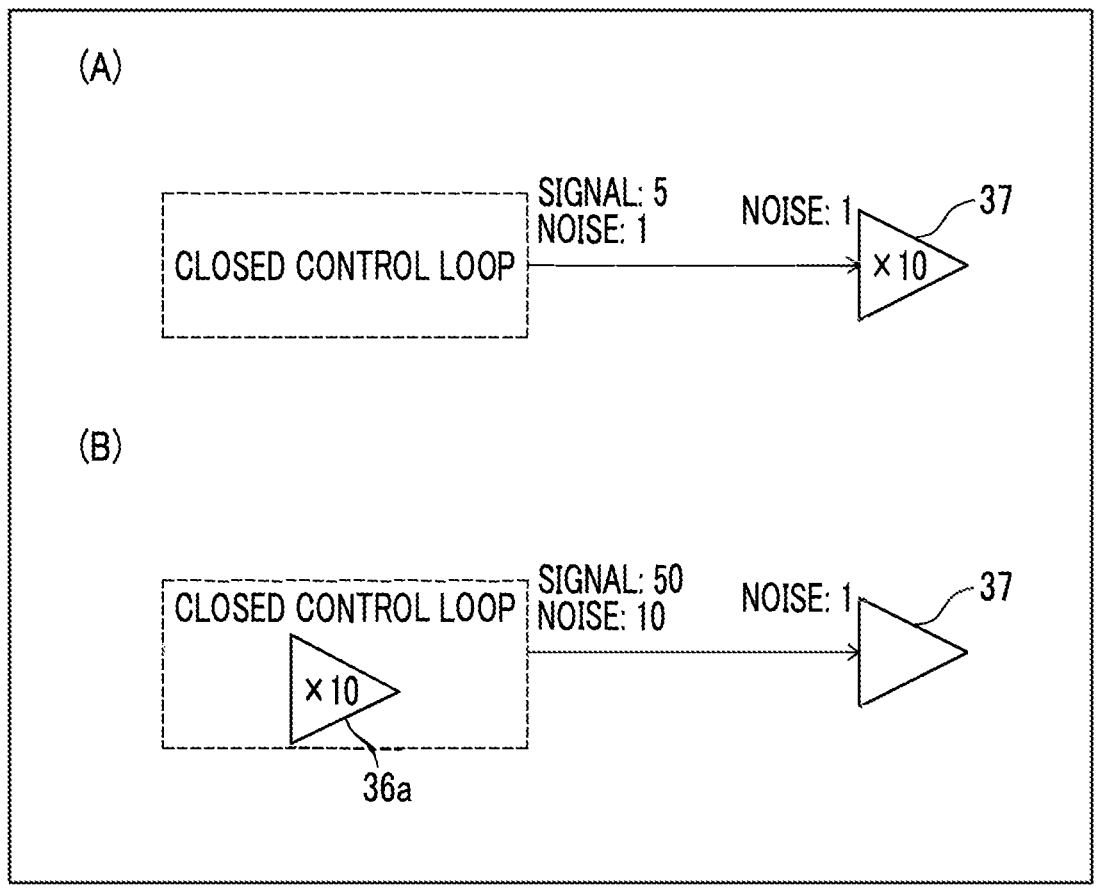
FIG. 4 is a diagram for explaining the signal and noise of the angular velocity sensor according to the embodiment.

As shown in FIG. 3, the primary side control circuit 12 in the angular velocity sensor 103a (103b, 104a, 104b, 105a, and 105b) includes an amplifier circuit 21, a synchronous detection circuit 22, a loop filter 23, a modulation circuit 24, a drive circuit 25, a Phase Locked Loop (PLL) circuit (phase synchronous circuit) 26, and a reference signal generation circuit 27. Then, the vibrator 11, the amplifier circuit 21, the synchronous detection circuit 22, the loop filter 23, the modulation circuit 24, and the drive circuit 25 are connected in this order to form the closed control loop. The loop filter 23 includes, for example, an integral filter. Note that, although FIG. 3 shows a configuration of the angular velocity sensor 103a, the angular velocity sensors 103b, 104a, 104b, 105a, and 105b also have the same configuration.

The secondary side control circuit 13 in the angular velocity sensor 103a (103b, 104a, 104b, 105a, and 105b) includes an amplifier circuit 31, a synchronous detection circuit 32, an adder circuit 33, a loop filter 34, a modulation circuit 35, a drive circuit 36 including the amplifier circuit 36a, and an amplifier circuit 37. Then, the vibrator 11, the amplifier circuit 31, the synchronous detection circuit 32, the adder circuit 33, the loop filter 34, the modulation circuit 35, and the drive circuit 36 are connected in this order to form the closed control loop. The adder circuit 33 is composed of a general addition-subtraction circuit using an operational amplifier. Further, the loop filter 34 includes, for example, an integral filter. Further, the output of the loop filter 34 is input to the amplifier circuit 37. Then, the amplifier circuit 37 amplifies the output from the closed control loop (loop filter 34). Then, the signal output from the amplifier circuit 37 is output as the sensor output of the angular velocity sensor 103a (103b, 104a, 104b, 105a, and 105b). Further, the amplifier circuit 36a amplifies an output from the modulation circuit 35. Note that, the amplifier circuit 36a is an example of a "first amplifier circuit" in the claims. Further, the amplifier circuit 37 is an example of a "second amplifier circuit" in the claims.

Here, in the present embodiment, the primary side control circuit 12 and the secondary side control circuit 13 are configured such that the function as the primary side control circuit 12 and the function as the secondary side control circuit 13 are interchangeable. Specifically, the angular velocity sensor 103a (103b, 104a, 104b, 105a, and 105b) include a plurality of switch elements 41 to 44. In the primary side control circuit 12, the switch element 41 is provided on a signal input side with respect to the vibrator 11, and the switch element 42 is provided on a signal output side with respect to the vibrator 11 (the output side of the amplifier circuit 21). Further, in the secondary side control circuit 13, the switch element 43 is provided on the signal input side with respect to the vibrator 11, and the switch element 44 is provided on the signal output side with respect to the vibrator 11 (the output side of the amplifier circuit 31).

The switch element 41, the switch element 42, the switch element 43, and the switch element 44 are configured to be able to switch between a state of being connected to the primary side control circuit 12 and a state of being connected to the secondary side control circuit 13, respectively. In FIG. 3 the switch element 41 and the switch element 42 show the state of being connected to the primary side control circuit 12, and the switch element 43 and the switch element 44 show the state of being connected to the secondary side control circuit 13. Further, the switch element 41 and the switch element 42 are switched so as to be connected to the secondary side control circuit 13, and the switch element 43 and the switch element 44 are switched so as to be connected to the primary side control circuit 12, so that the function as the primary side control circuit 12 and the function as the secondary side control circuit 13 are interchangeable. That is, the angular velocity sensor 103*a* (103*b*, 104*a*, 104*b*, 105*a*, and 105*b*) is configured so that the function of inducing the primary vibration and the function of detecting the secondary vibration are interchangeable. The plurality of switch elements 41 to 44 are configured to be controlled by the control unit 101.

The control unit 101 is configured to cancel the bias component by differentiating the sensor output before and after interchange of the function as the primary side control circuit 12 and the function as the secondary side control circuit 13.

Further, the control unit 101 is configured to perform control for switching the state of the angular velocity sensor 103*a* (104*a* and 105*a*) between any of a first state in which the angular velocity is detected by interchanging the function of the primary side control circuit 12 and the function of the secondary side control circuit 13 and a second state in which the angular velocity is detected without the function of the primary side control circuit 12 and the function of the secondary side control circuit 13 being interchanged. Specifically, the control unit 101 is configured to perform control for interchanging the function of the primary side control circuit 12 and the function of the secondary side control circuit 13 by the operation of switching the plurality of switch elements 41 to 44, and not interchanging the function of the primary side control circuit 12 and the function of the secondary side control circuit 13 by not performing the operation of switching the plurality of switch elements 41 to 44 in the second state. As a result, the azimuth/attitude angle measuring device 100 is configured to function as a gyro compass in the first state in a stationary state and function as an inertial navigation device in the second state in a motion state (moving state). In the first state, the azimuth/attitude angle measuring device 100 detects the rotation angular velocity of the earth and detects a north-south direction. Further, in the second state, the azimuth/attitude angle measuring device 100 detects the own angular velocity of the azimuth/attitude angle measuring device 100 due to motion (movement), and detects own position (direction) of the azimuth/attitude angle measuring device 100.

Note that, even when the angular velocity sensor 103*a* (104*a* and 105*a*) is in either the first state or the second state, the angular velocity sensor 103*b* (104*b* and 105*b*) is configured to detect the angular velocity by interchanging the function of the primary side control circuit 12 and the function of the secondary side control circuit 13.

(Switching of Detection Range and Frequency Band)

Here, in the present embodiment, the control unit 101 is configured to perform control for switching between the detection range and the frequency band of the angular velocity sensor 103*a* (104*a* and 105*a*) in the stationary state and the motion state (in the present embodiment, the first state and the second state). Specifically, the control unit 101 is configured to perform control for switching between the detection range and the frequency band of the angular velocity sensor 103*a* (104*a* and 105*a*) by switching the amplification rate of the amplifier circuit 36*a* in the amplifier circuit 36*a* and the amplifier circuit 37 in the stationary state and the motion state (the first state and the second state). Note that, the detection range indicates a range of angular velocity that can be detected without saturation. Further, the frequency band indicates an input frequency of the angular velocity that can be detected.

In the stationary state (first state), the control unit 101 is configured to perform control for switching the detection range and the frequency band of the angular velocity sensor 103*a* (104*a* and 105*a*) to a first detection range and a first frequency band, respectively, by switching the amplification rate of the amplifier circuit 36*a* to a first amplification rate. Further, in the motion state (second state), the control unit 101 is configured to perform control for switching the detection range and the frequency band of the angular velocity sensor 103*a* (104*a* and 105*a*) to a second detection range larger than the first detection range and a second frequency band larger than the first frequency band, respectively, by switching the amplification rate of the amplifier circuit 36*a* to a second amplification rate larger than the first amplification rate. That is, the control unit 101 is configured to perform control for reducing the detection range and the frequency band by reducing the amplification rate of the amplifier circuit 36*a*, and for increasing the detection range and the frequency band by increasing the amplification rate of the amplifier circuit 36*a*. Note that, although detailed description will be omitted, the angular velocity sensors 103*b* (104*b* and 105*b*) is also configured to switch the detection range and the frequency band, similarly to the angular velocity sensors 103*a* (104*a* and 105*a*).

Here, referring to FIGS. 4(A) and 4(B), a change in the S/N ratio of the angular velocity sensor 103*a* (103*b*, 104*a*, 104*b*, 105*a*, and 105*b*) when switching the detection range and the frequency band using the amplifier circuit 36*a* and a change in the S/N ratio of the angular velocity sensor 103*a* (103*b*, 104*a*, 104*b*, 105*a*, and 105*b*) when switching the detection range and the frequency band using the amplifier circuit 37 will be described. Note that, the S/N ratio of the output of the angular velocity sensor 103*a* (103*b*, 104*a*, 104*b*, 105*a*, and 105*b*) is basically determined based on a signal and noise generated in the closed control loop and input noise generated in the amplifier circuit 37.

As shown in FIG. 4(A), when the detection range and the frequency band of the angular velocity sensor 103*a* (103*b*, 104*a*, 104*b*, 105*a*, and 105*b*) are switched by switching the amplification rate of the amplifier circuit 37, the ratio of the signal and noise generated in the closed control loop to the input noise generated in the amplifier circuit 37 does not change, so that the S/N ratio of the output of the angular velocity sensor 103*a* (103*b*, 104*a*, 104*b*, 105*a*, and 105*b*) does not change. For example, consider a case where the value of the signal generated in the closed control loop is 5, the value of the noise generated in the closed control loop is 1, and the value of the input noise generated in the amplifier circuit 37 is 1. In this case, the S/N ratio before amplification is $5/\sqrt{(1^2+1^2)}=3.53$. Further, when the signal containing noise is amplified 10 times by the amplifier circuit 37, the S/N ratio after amplification is $5\times10/10\sqrt{(1^2+1^2)}=3.53$. As described above, when the signal containing noise is amplified by the amplifier circuit 37, the S/N ratio of the output of the angular velocity sensor 103a (103b, 104a, 104b, 105a, and 105b) does not change.

On the other hand, as shown in FIG. 4(B), when switching the detection range and the frequency band of the angular velocity sensor 103a (103b, 104a, 104b, 105a, and 105b) by switching the amplification rate of the amplifier circuit 36a, it is possible to change the signal and the noise generated in the closed control loop without changing the input noise generated in the amplifier circuit 37, so that it is possible to improve the S/N ratio of the output of the angular velocity sensor 103a (103b, 104a, 104b, 105a, and 105b). For example, consider a case where the value of the signal generated in the closed control loop is 5, the value of the noise generated in the closed control loop is 1, and the value of the input noise generated in the amplifier circuit 37 is 1. In this case, the S/N ratio before amplification is $5/\sqrt{(1^2+1^2)}=3.53$. Further, when the signal containing noise is amplified 10 times by the amplifier circuit 36a, the value of the input noise generated in the amplifier circuit 37 remains 1, the value of the signal generated in the closed control loop is 50, and the value of the noise generated in the closed control loop is 10. Therefore, the S/N ratio after amplification is $50/\sqrt{(10^2+1^2)}=4.98$. As described above, when the signal containing noise is amplified by the amplifier circuit 36a, it is possible to improve the S/N ratio of the output of the angular velocity sensor 103a (103b, 104a, 104b, 105a, and 105b), as compared with the case where the signal containing noise is amplified by the amplifier circuit 37.

Note that, in general, when the frequency band is changed, the value of noise also changes in accordance with the frequency band changes, but in the example of FIGS. 4(A) and 4(B), the change in noise according to the change in the frequency band is not taken into consideration for ease of understanding.

(Switching of Offset Value)

Here, in the present embodiment, the control unit 101 is configured to perform control for switching the offset value for correcting the fluctuation of the sensor output due to temperature change in the first state and the second state.

Specifically, as shown in FIG. 3, the angular velocity sensor 103a (103b, 104a, 104b, 105a, and 105b) is provided with addition-subtraction amount adjusting circuits 14a and 14b to which the output from the primary side control circuit 12 (output from the loop filter 23) is input. The addition-subtraction amount adjusting circuits 14a and 14b are configured to adjust the magnitude of the output of the loop filter 23 of the primary side control circuit 12 dependent of temperature so that the adjusted output (first offset value) is input to the adder circuit 33 of the secondary side control circuit 13. For example, in the addition-subtraction amount adjusting circuits 14a and 14b, the addition amount of the first offset value is adjusted by dividing a voltage using a potentiometer (volume resistance) or the like.

Further, the angular velocity sensor 103a (103b, 104a, 104b, 105a, and 105b) is provided with an addition-subtraction amount adjusting circuit 15a to which a constant signal S1 independent of temperature is input. The addition-subtraction amount adjusting circuit 15a is configured to adjust the magnitude of the constant signal S1 so that the adjusted constant signal S1 (second offset value) is input to the adder circuit 33 of the secondary side control circuit 13. For example, in the addition-subtraction amount adjusting circuit 15a, the addition amount of the constant signal S1 is adjusted by dividing a voltage using a potentiometer (volume resistance) or the like.

Further, the angular velocity sensor 103a (103b, 104a, 104b, 105a, and 105b) is provided with an addition-subtraction amount adjusting circuit 15b to which a constant signal S2 independent of temperature is input. The addition-subtraction amount adjusting circuit 15b is configured to adjust the magnitude of the constant signal S2 so that the adjusted constant signal S2 (second offset value) is input to the adder circuit 33 of the secondary side control circuit 13. For example, in the addition-subtraction amount adjusting circuit 15b, the addition amount of the constant signal S2 is adjusted by dividing a voltage using a potentiometer (volume resistance) or the like.

<Configuration without Interchange of Functions>

Here, the correction when the function as the primary side control circuit 12 and the function as the secondary side control circuit 13 are not interchanged (that is, in the case of the second state) will be described.

First, an error of the output of the angular velocity sensor 103a (103b, 104a, 104b, 105a, and 105b) to be corrected will be described. As the error of the output of the angular velocity sensor 103a (103b, 104a, 104b, 105a, and 105b), the error of the output of the angular velocity sensor 103a (103b, 104a, 104b, 105a, and 105b), which is generated due to an error signal generated from the circuit block constituting the secondary side control circuit 13, and the error of the output of the angular velocity sensor 103a (103b, 104a, 104b, 105a, and 105b), which is generated due to influence (crosstalk) from the primary side control circuit 12, exist. It is assumed that the component (error component) of the error signal, which is generated from the circuit block constituting the secondary side control circuit 13, is a constant value having no temperature dependence. Note that, in general, in a feedback circuit, an output signal from each circuit is expressed using a value obtained by dividing an input signal input to each circuit by a feedback gain (output signal=input signal×1/(feedback gain)).

The total $V_{Out\_Total\_Error}$ of the error of the sensor output generated in the closed control loop of the secondary side control circuit 13 due to the error signal generated from the circuit block constituting the secondary side control circuit 13 and the error of the sensor output generated in the closed control loop of the secondary side control circuit 13 due to the crosstalk from the primary side control circuit 12 to the secondary side control circuit 13 is expressed by Equation (1). Note that, A, B, and C are constant values (coefficients) independent of temperature.

$$V_{Out\_Total\_Error} = A \cdot \frac{1}{G_R^2(T)} + B \cdot \frac{1}{G_R(T)} + C \tag{1}$$

Next, a case where the error $V_{Out\_Total\_Error}$ of the sensor output expressed by Equation (1) is corrected will be specifically described.

First, $V_{in\_Const\_Corr}$ (second offset value) based on the constant signal independent of temperature is added to the input (path 2) of the loop filter 34 of the secondary side control circuit 13. In this case, the sensor output $V_{Out\_Const\_Corr}$ is expressed by Equation (2).

$$V_{Out\_Const\_Corr} = P \cdot \frac{1}{G_R(T)} \tag{2}$$

Here, when the second offset value based on the constant signal independent of temperature is added to the input of the loop filter 34, the sensor output $V_{Out\_Const\_Corr}$ becomes a value inversely proportional to a gain $G_R$ (T) dependent on temperature as shown in Equation (2). Note that, P in Equation (2) is a constant value. Then, $B/G_R$ (T), which is the second term of the Equation (1), is cancelled by adjusting $V_{in\_Const\_Corr}$ (second offset value) by the addition-subtraction amount adjusting circuit 15a so that the magnitude of P in the Equation (2) and the magnitude of B of $B/G_R$ (T), which is the second term in Equation (1), are equal (P=−B). That is, by adjusting the second offset value based on the constant signal S1 independent of temperature and adding the adjusted second offset value to the input of the loop filter 34, it is possible to cancel the term inversely proportional to the gain $G_R$ (T) dependent on temperature in Equation (1).

Further, the output $V_{AGC}$ of the loop filter 23 of the primary side control circuit 12 dependent on temperature is expressed by Equation (3). Note that, the output $V_{AGC}$ of the loop filter 23 is the output of the loop filter 23 in consideration of the closed control loop, and is a value dependent on temperature.

$$V_{AGC} = D \cdot \frac{1}{G_R(T)} \qquad (3)$$

Here, in the correction according to the present embodiment, in addition to $V_{in\_Const\_Corr}$ (second offset value) based on the constant signal independent of temperature, a value (first offset value) obtained by multiplying an output $V_{AGC}$ by a certain ratio is added to the input (path 2) of the loop filter 34 of the secondary side control circuit 13. The sensor output $V_{Out\_AGC\_corr}$ when the first offset value is added is expressed by Equation (4).

$$V_{Out\_AGC\_Corr} = r \frac{1}{G_R^4(T)} \qquad (4)$$

Here, when the first offset value based on the output of the primary side control circuit 12 dependent on temperature is added to the input of the loop filter 34, the sensor output $V_{Out\_AGC\_corr}$ depends on the temperature as shown in Equation (4). The value is inversely proportional to the square of the gain $G_R$ (T). In addition, r in Equation (4) is a constant value. Then, $A/G_R^2$ (T), which is the first term of the Equation (1), is cancelled by adjusting the ratio by the addition-subtraction amount adjusting circuit 14b so that the magnitude of r in Equation (4) is equivalent to the magnitude of A in the first term $A/G_R^2$ (T) including the square of $G_R$ (T) in Equation (1) (r=−A). That is, while the sensor output becomes a value obtained by adding the error expressed by the Equation (1) to the original sensor output when the sensor output is not corrected, the first offset value and the second offset value are added in the present embodiment, so that the sensor output becomes a value obtained by adding the constant value C to the original sensor output.

Note that, since C in Equation (1) is a constant value independent of temperature, there is no problem in correction. Further, the coefficients A, B and C in Equation (1) are calculated by measuring (actually measuring) the sensor output before correction (before compensation) at each temperature and by performing polynomial approximation on the measured data by the least squares method. Note that, the coefficients A, B and C are calculated for each angular velocity sensor 103a (103b, 104a, 104b, 105a, and 105b) (for each product).

In this way, the sensor output is corrected by adjusting the addition amount of the first offset value based on the output of the primary side control circuit 12 dependent on temperature so that $A/G_R^2$ (T) (a term inversely proportional to the square of the gain $G_R$ (T) dependent on temperature), which is the first term of Equation (1), is set to 0 and by adjusting the addition amount of the second offset value based on the constant signal independent of temperature so that $B/G_R$ (T) (a term inversely proportional to the gain $G_R$ (T) dependent on temperature), which is the second term of the Equation (1), is set to 0.

Figure 5:
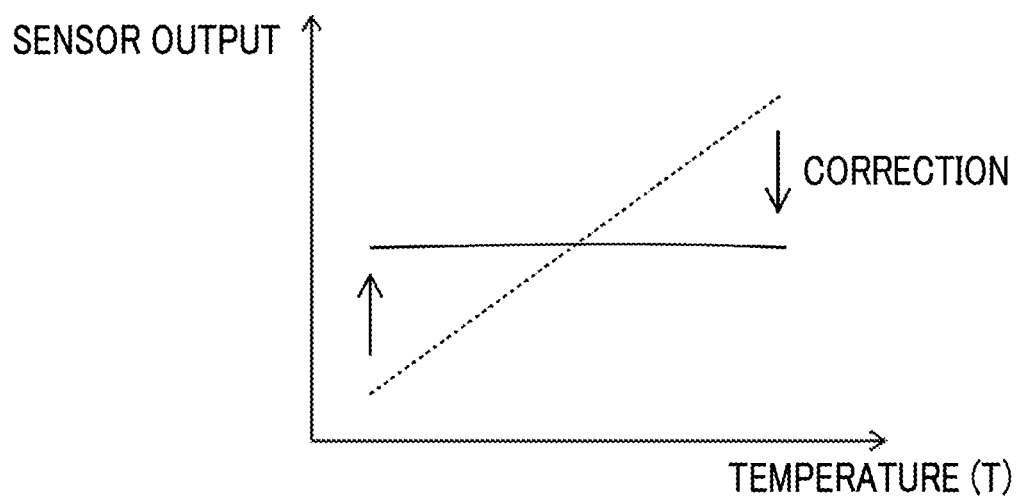
FIG. 5 is a diagram for explaining the correction of the sensor output of the angular velocity sensor (correction of a component proportional to $1/G_R$ (T) (the first power of temperature)) according to the embodiment.
Figure 6:
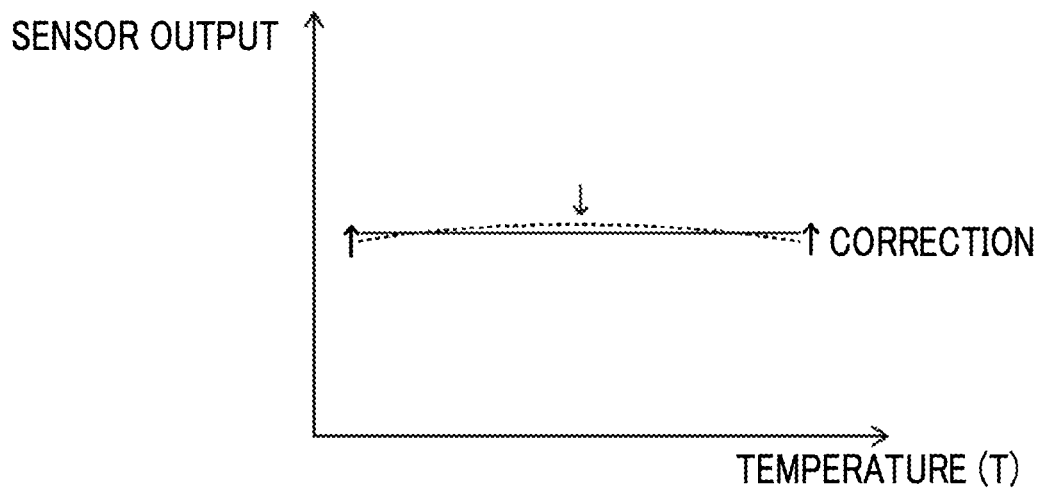
FIG. 6 is a diagram for explaining the correction of the sensor output of the angular velocity sensor (correction of a component proportional to $1/G_R^2$ (T) (square of temperature)) according to the embodiment.

That is, as shown in FIG. 5, the component (the second term of Equation (1)) proportional to $1/G_R$ (T) of the error of the sensor output (the term inversely proportional to the gain $G_R$ (T) dependent on temperature) is cancelled by adding the second offset value based on the constant signal independent of temperature, so that the sensor output (dotted line in FIG. 5) having a characteristic dependent on temperature becomes approximately constant (solid line in FIG. 5). However, as shown in FIG. 6, even the sensor output, which is made approximately constant, microscopically has a characteristic dependent on temperature (dotted line in FIG. 6). Therefore, the component (the first term in Equation (1)) proportional to $1/G_R^2$ (T) of the sensor output (a term inversely proportional to the square of the gain $G_R$ (T) dependent on temperature) is cancelled by adding the first offset value based on the output of the primary side control circuit 12 dependent on temperature, so that the sensor output (solid line in FIG. 6) is independent on temperature and becomes approximately constant. As a result, it is possible to improve the accuracy of correction.

As described above, when the function as the primary side control circuit 12 and the function as the secondary side control circuit 13 are not interchanged (that is, in the case of the second state), a first offset value based on the output of the primary side control circuit 12 (the output of the loop filter 23) inversely proportional to the temperature change of the gain of the vibrator 11 in order to correct the sensor output inversely proportional to the square of the temperature change of the gain of the vibrator 11 from the secondary side control circuit 13 is added to a second offset value based on the constant signal independent of temperature in order to correct the sensor output inversely proportional to the temperature change of the gain of the vibrator 11 from the secondary side control circuit 13, in the closed control loop of the secondary side control circuit 13 (input of the loop filter 34 of the secondary side control circuit 13), and the addition amount of the first offset value and the addition amount of the second offset value are adjusted by the addition-subtraction amount adjusting circuit 14b and the addition-subtraction amount adjusting circuit 15a, respectively, so that the sensor output (output from the secondary side control circuit 13) is corrected. Then, the first offset value and the second offset value are determined and added so as to reduce the error of the sensor output, which is generated in the closed control loop of the secondary side control circuit 13 due to an error signal generated from a circuit block constituting the secondary side control circuit 13 and the error of the sensor output, which is generated in the closed control loop of the secondary side control circuit 13 due to crosstalk (signal crossing) from the primary side control circuit 12 to the secondary side control circuit 13, so that the sensor output is corrected.

<Configuration with Interchange of Functions>

Next, the correction when the function as the primary side control circuit 12 and the function as the secondary side control circuit 13 are interchanged (that is, in the case of the first state) will be described.

In this case, in the present embodiment, an offset value after interchange (the first offset value and the second offset value) and the offset value before interchange are symmetric values with respect to a predetermined reference value. In other words, a configuration is made so that the absolute value of the difference between the offset value added to the closed control loop before interchange and the predetermined reference value is approximately equal to the absolute value of the difference between the offset value added to the closed control loop after interchange and the predetermined reference value.

Specifically, in the present embodiment, when a temporary offset value before interchange is set to a, a temporary offset value after interchange is set to −a, and a temporary offset value with respect to a median value of the sensor output before interchange and the sensor output after interchange is set to b, the offset value before interchange is a +b and the offset value after interchange is −a +b. Note that, the temporary offset value a indicates a first temporary offset value a1 which will be described later and a second temporary offset value a2 which will be described later. Further, the temporary offset value b indicates a first temporary offset value b1 described later and a second temporary offset value b2 which will be described later.

Specifically, as shown in FIG. 3, an inverting circuit 51 and a switch element 52 are provided on the output side of the addition-subtraction amount adjusting circuit 14a. The switch element 52 is configured to be able to switch between a state of being connected to the addition-subtraction amount adjusting circuit 14a and a state of being connected to the inverting circuit 51. Then, in a state in which the switch element 52 is connected to the addition-subtraction amount adjusting circuit 14a, an output (a1) from the addition-subtraction amount adjusting circuit 14a and an output (b1) from the addition-subtraction amount adjusting circuit 14b are input to the adder circuit 33. That is, a1+b1 is added as the first offset value to the secondary side control circuit 13. Further, in a state in which the switch element 52 is connected to the inverting circuit 51, the output (−a1) from the inverting circuit 51 and the output (b1) from the addition-subtraction amount adjusting circuit 14b are input to the adder circuit 33. That is, −a1+b1 is added as the first offset value to the secondary side control circuit 13. Note that, a method for obtaining a1 and b1 will be described later.

Further, an inverting circuit 45 and a switch element 46 are provided on the output side of the addition-subtraction amount adjusting circuit 15b. The switch element 46 is configured to be able to switch between a state of being connected to the addition-subtraction amount adjusting circuit 15b and a state of being connected to the inverting circuit 45. Then, in a state in which the switch element 46 is connected to the addition-subtraction amount adjusting circuit 15b, an output (a2) from the addition-subtraction amount adjusting circuit 15b and an output (b2) from the addition-subtraction amount adjusting circuit 15a are input to the adder circuit 33. That is, a2+b2 is added to the secondary side control circuit 13 as the second offset value. Further, in a state in which the switch element 46 is connected to the inverting circuit 45, the output (−a2) from the inverting circuit 45 and the output (b2) from the addition-subtraction amount adjusting circuit 15a are input to the adder circuit 33. That is, −a2+b2 is added as the second offset value to the secondary side control circuit 13. Note that, a method for obtaining a2 and b2 will be described later.

Figure 7:
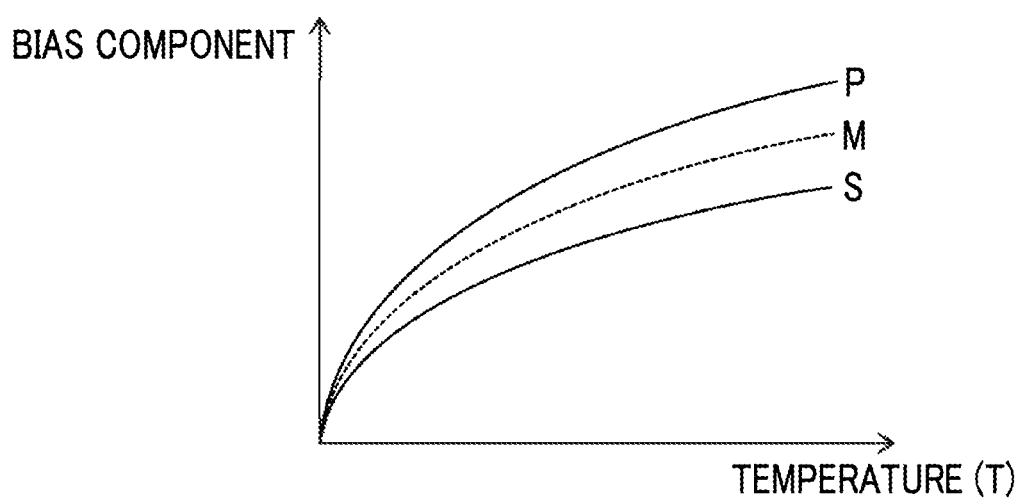
FIG. 7 is a diagram showing the relationship between temperature and a bias component.
Figure 8:
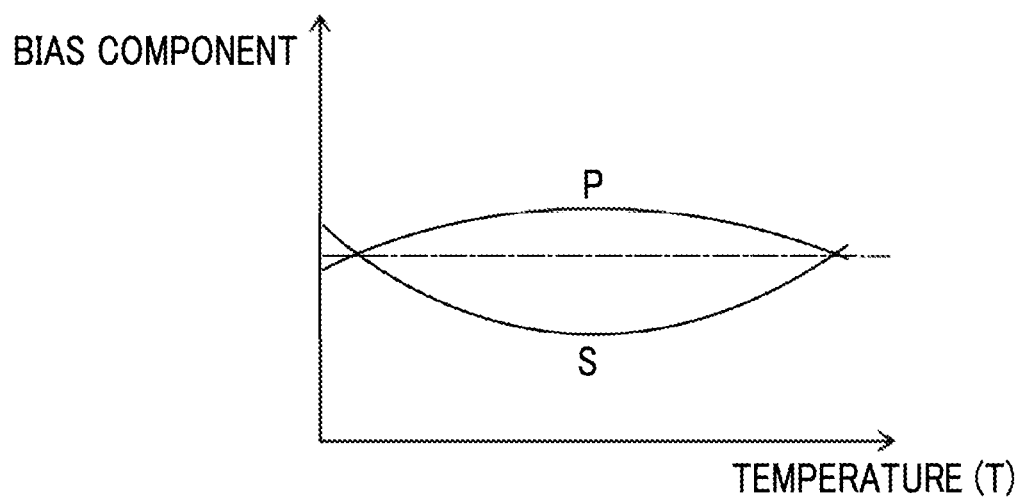
FIG. 8 is a diagram (1) showing the relationship between temperature after the correction of the sensor output by an offset value and the bias component.

As shown in FIG. 7, in general, in the angular velocity sensor, the bias component (vertical axis) of the angular velocity detected by the angular velocity sensor changes with respect to the temperature change (horizontal axis). Further, the change in the bias component before the function as the primary side control circuit 12 and the function as the secondary side control circuit 13 are interchanged (P in FIG. 7) is different from the change in the bias component after interchange (S in FIG. 7). Then, as shown in FIG. 8, before interchange, the first offset value and the second offset value are added so as to cancel the first term and the second term of Equation (1), so that the temperature change of the sensor output (P in FIG. 8) becomes small. Further, after interchange, the first offset value and the second offset value are added so as to cancel the first term and the second term of Equation (1), so that the temperature change (S in FIG. 8) of the sensor output becomes small. Note that, since P and S in FIG. 8 is not symmetrical with respect to the line segment (the alternate long and short dash line in FIG. 8) along the horizontal axis, the temperature fluctuation component of the difference between P and S in FIG. 8 does not become zero. In this way, when the first offset value and the second offset value are individually determined so as to cancel the first term and the second term of Equation (1) before and after interchange, the temperature fluctuation component of the difference between P and S of FIG. 8 does not become zero.

Therefore, as shown in FIG. 9A, the first temporary offset value a1 and the second temporary offset value a2 before and after interchange are determined so that the temperature fluctuation component of the difference becomes the smallest before and after interchange and the polarity of the offset value is reversed before and after interchange. When the first temporary offset value a1 and the second temporary offset value a2 are used before interchange, the first term and the second term of Equation (1) are not cancelled, so that the bias component has a gradient with respect to temperature in a state before interchange. Similarly, when the first temporary offset value −a1 and the second temporary offset value −a2 are used after interchange, the first term and the second term of Equation (1) are not cancelled, so that the bias component has a gradient with respect to temperature in a state after interchange.

Therefore, as shown in FIG. 9B, the first temporary offset value b1 and the second temporary offset value b2 are determined so as to cancel the first term and the second term of Equation (1) with respect to the median value (M in FIG. 7) between the change in the bias component (P in FIG. 7) before the function as the primary side control circuit 12 and the function as the secondary side control circuit 13 are interchanged and the change in the bias component (S in FIG. 7) after interchange. Then, the first offset value is set to a1+b1 and the second offset value is set to a2+b2 before interchange, and the first offset value is set to −a1+b1 and the second offset value is −a2+b2 after interchange. As a result, before and after interchange, the first offset value becomes symmetrical with respect to the first temporary offset value b1 with respect to the median value, and the second offset value becomes symmetrical with respect to the second temporary offset value b2 with respect to the median value. As a result, as shown in FIG. 10, both the temperature gradients of the change in the bias component before interchange (P in FIG. 10) and the change in the bias component after interchange (S in FIG. 10) are reduced. As a result, it is possible to reduce the temperature gradient of the bias component while reducing the difference between P and S in FIG. 10 (residual bias component).

As described above, when the function as the primary side control circuit 12 and the function as the secondary side control circuit 13 are interchanged (that is, the case of the first state), the first offset value, which is based on the output of the primary side control circuit 12 (the output of the loop filter 23) inversely proportional to the temperature change of the gain of the vibrator 11 so as to correct sensor output inversely proportional to the square of the temperature change of the gain of the vibrator 11 from the secondary side control circuit 13 in the closed control loop of the secondary side control circuit 13 (input of the loop filter 34 of the secondary side control circuit 13), is added to the second offset value, which is based on the constant signal independent of temperature so as to correct the sensor output inversely proportional to the temperature change of the gain of the vibrator 11 from the secondary side control circuit 13, and the addition amount of the first offset value and the addition amount of the second offset value are respectively adjusted by the addition-subtraction amount adjusting circuit 14a and 14b and the addition-subtraction amount adjusting circuit 15a and 15b, so that the sensor output (output from the secondary side control circuit 13) is corrected. Then, the first offset value and the second offset value are determined and added so as to reduce the error of the sensor output, which is generated in the closed control loop of the secondary side control circuit 13 due to an error signal generated from a circuit block constituting the secondary side control circuit 13 and the error of the sensor output, which is generated in the closed control loop of the secondary side control circuit 13 due to crosstalk (signal crossing) from the primary side control circuit 12 to the secondary side control circuit 13, so that the sensor output is corrected.

(Correction of Bias Component in Motion State)

Here, in the present embodiment, in the second state, the control unit 101 is configured to perform control for detecting the angular velocity without the function of the primary side control circuit 12 and the function of the secondary side control circuit 13 in the angular velocity sensor 103a (104a and 105a) being interchanged in a predetermined period, detecting the angular velocity by interchanging the function of the primary side control circuit 12 and the function of the secondary side control circuit 13 in the angular velocity sensor 103b (104b and 105b), and acquiring the bias component of the angular velocity sensor 103a (104a and 105a) based on an angular velocity detection result by the angular velocity sensor 103a (104a and 105a) and an angular velocity detection result by the angular velocity sensors 103b (104b and 105b).

Specifically, the control unit 101 performs control such that the angular velocity sensor 103b (104b and 105b) performs a process of detecting the angular velocity based on the secondary vibration of the vibrator 11 by the secondary side control circuit 13 in a predetermined period, and a process of detecting an angular velocity based on the secondary vibration of the vibrator 11 by the primary side control circuit 12 by interchanging the function of the primary side control circuit 12 and the function of the secondary side control circuit 13. As shown in FIG. 11(C), in a predetermined period from time t1 to time t2 and from time t4 to time t5, a process of detecting the angular velocity based on the secondary vibration of the vibrator 11 by the secondary side control circuit 13 in the angular velocity sensors 103b (104b and 105b) and a process of detecting the angular velocity based on the secondary vibration of the vibrator 11 by the primary side control circuit 12 of the angular velocity sensors 103b (104b and 105b) are performed.

Further, the control unit 101 is configured to control a process of detecting the angular velocity in a predetermined period by the angular velocity sensor 103a (104a and 105a) in the second state. As shown in FIG. 11(B), in a predetermined period from time t1 to time t2 and from time t4 to time t5, the process of detecting the angular velocity based on the secondary vibration of the vibrator 11 is performed by the secondary side control circuit 13 in the angular velocity sensor 103a (104a and 105a) in the second state.

Further, the control unit 101 is configured to calculate the bias component (B1(t)) of the angular velocity sensor 103a (104a and 105a) in the second state by subtracting the value of a second detection result detected by the angular velocity sensor 103b (104b and 105b) in the predetermined period from the value of a first detection result detected by the angular velocity sensor 103a (104a and 105a) in the second state in the predetermined period.

Figure 11:
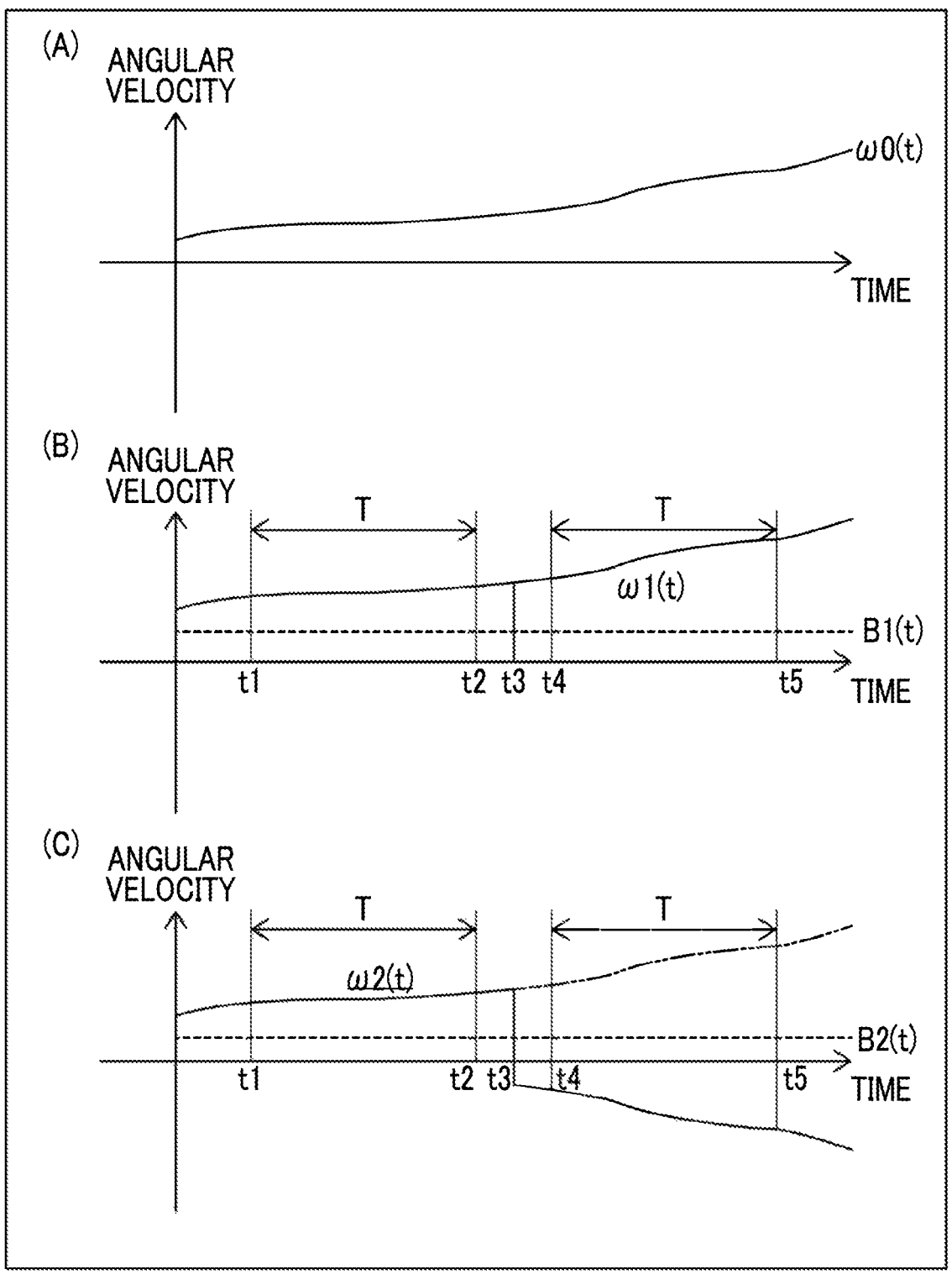
FIG. 11 is a diagram for explaining the calculation of the bias of a vibration-type angular velocity sensor according to the embodiment.
Figure 12:
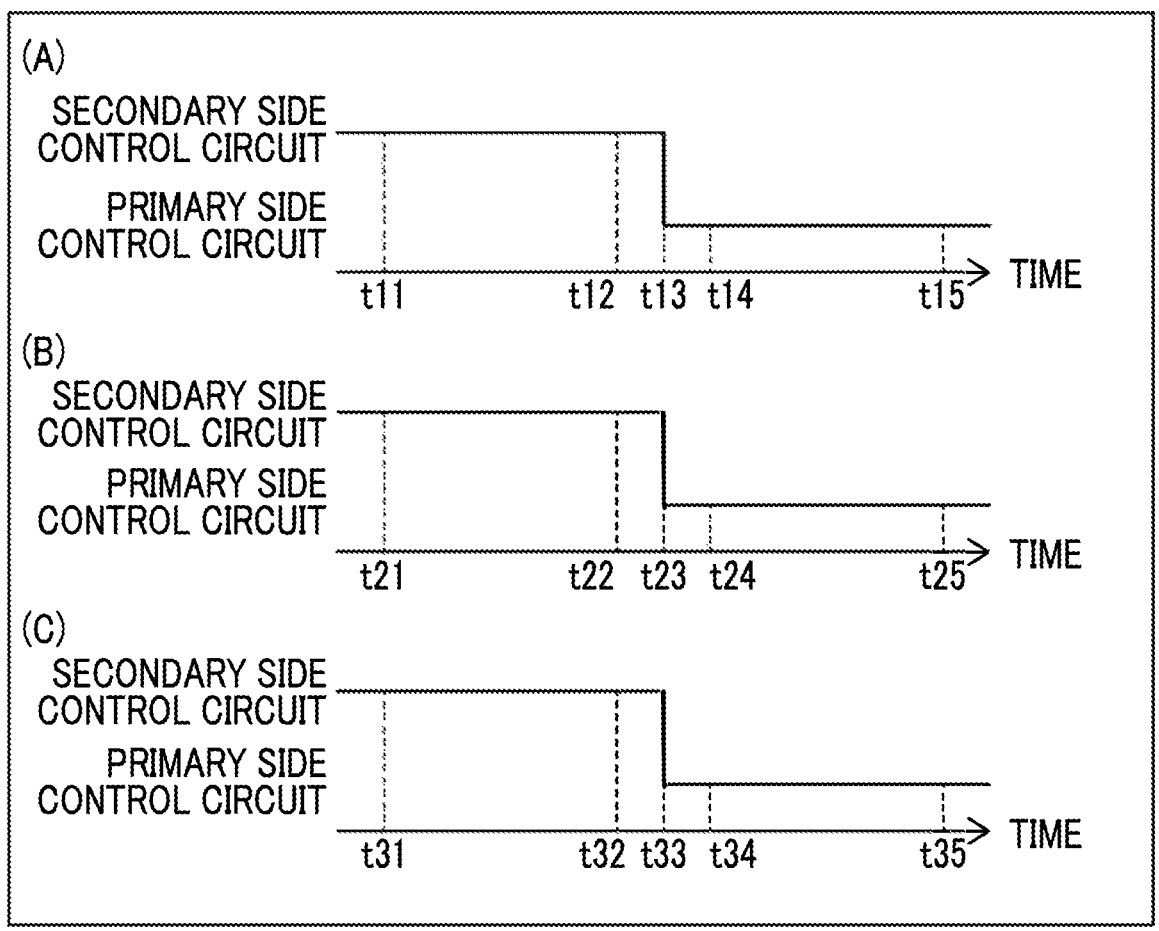
FIG. 12 is a diagram for explaining a timing of interchanging the function of a primary side control circuit and the function of a secondary side control circuit in the plurality of angular velocity sensors according to the embodiment.

Note that, the predetermined period includes a first period (a period from time t1 to time t2) in which the process of detecting the angular velocity based on the secondary vibration of the vibrator 11 is performed by the secondary side control circuit 13, and a second period (a period from time t4 to time t5) in which the process of detecting the angular velocity based on the secondary vibration of the vibrator 11 is performed by the primary side control circuit 12. Further, the first period and the second period have the same length of time. As shown in FIG. 11, each of the first period and the second period has a length of time T.

The first detection result is an integral value of the angular velocity detected by the angular velocity sensor 103a (104a and 105a) in the second state in the predetermined period. The second detection result is an integral value of the angular velocity detected by the angular velocity sensors 103b (104b and 105b) in the predetermined period.

Further, the predetermined period is a period in which the bias component of the angular velocity sensors 103b (104b and 105b) is approximately constant. For example, the predetermined period has a length of about several seconds to several tens of seconds. Further, the predetermined period is a period in which it is possible to ignore the influence of the temperature change and it is possible to assume that the bias component of the angular velocity sensor 103b (104b and 105b) does not change approximately.

The integral value I1 of the first detection result in the predetermined period (the first period from time t1 to time t2 and the second period from time t4 to time t5) shown in FIG. 11(B) is expressed as in Equation (5).

$$I1 = \int_{t1}^{t2} \omega 1(t)dt + \int_{t4}^{t5} \omega 1(t)dt \qquad \text{Equation (5)}$$

However, the angular velocity ω1(t) detected by the secondary side control circuit 13 in the angular velocity sensor 103a (104a and 105a) in the second state is expressed as in Equation (6) using the angular velocity (true angular velocity) ω0(t) generated by the motion (movement) shown in FIG. 11(A) and the bias B1(t) of the angular velocity sensor 103a (104a and 105a) in the second state.

$$\omega 1 = \omega 0(t) + B1(t) \qquad \text{Equation (6)}$$

Therefore, Equation (5) is derived as in Equation (7).

$$I1 = \int_{t1}^{t2} (\omega 0(t) + B1(t))dt + \int_{t4}^{t5} (\omega 0(t) + B1(t))dt \quad \text{Equation (7)}$$

$$I1 = \int_{t1}^{t2} \omega 0(t)dt + \int_{t1}^{t2} B1(t)dt + \int_{t4}^{t5} \omega 0(t)dt + \int_{t4}^{t5} B1(t)dt$$

Further, an integral value 12 of the second detection result in the predetermined period (the first period from time t1 to time t2 and the second period from time t4 to time t5) shown in FIG. 11(C) is expressed as in Equation (8).

$$I2 = \int_{t1}^{t2} \omega 2(t)dt - \int_{t4}^{t5} \omega 2(t)dt \quad \text{Equation (8)}$$

In the second period from time t4 to time t5, the integral value is subtracted in consideration of a fact that ω2(t) is reversed with respect to the bias component.

The angular velocity ω2(t) detected by the secondary side control circuit 13 in the angular velocity sensors 103b (104b and 105b) and the angular velocity ω2(t) detected by the primary side control circuit 12 are expressed as in Equation (9) and Equation (10), respectively, using the angular velocity (true angular velocity) ω0(t) generated by the motion (movement) shown in FIG. 11(A) and the bias B2(t) of the angular velocity sensor 103b (104b and 105b).

$$\omega 2(t) = \omega 0(t) + B2(t) \quad \text{Equation (9)}$$

$$\omega 2(t) = -\omega 0(t) + B2(t) \quad \text{Equation (10)}$$

In Equation (10) in the second period from time t4 to time t5, since ω0(t) is reversed with respect to the bias component, a minus is applied.

Therefore, Equation (8) is derived as in Equation (11).

$$I2 = \int_{t1}^{t2} (\omega 0(t) + B2(t))dt - \int_{t4}^{t5} (-\omega 0(t) + B2(t))dt \quad \text{Equation (11)}$$

$$I2 = \int_{t1}^{t2} \omega 0(t)dt + \int_{t1}^{t2} B2(t)dt + \int_{t4}^{t5} \omega 0(t)dt - \int_{t4}^{t5} B2(t)dt$$

When the integral value I2 of the second detection result is subtracted from the integral value I1 of the first detection result, Equation is derived as in Equation (12).

$$I1 - I2 = \int_{t1}^{t2} \omega 0(t)dt + \int_{t1}^{t2} B1(t)dt + \int_{t4}^{t5} \omega 0(t)dt + \int_{t4}^{t5} B1(t)dt -$$

$$\int_{t1}^{t2} \omega 0(t)dt - \int_{t1}^{t2} B2(t)dt - \int_{t4}^{t5} \omega 0(t)dt + \int_{t4}^{t5} B2(t)dt$$

$$I1 - I2 = \int_{t1}^{t2} B1(t)dt + \int_{t4}^{t5} B1(t)dt + \int_{t1}^{t2} B2(t)dt - \int_{t4}^{t5} B2(t)dt$$

Here, in the first period from time t1 to time t2 and the second period from time t4 to time t5, the amount of change over time of each of the bias B1(t) of the angular velocity sensor 103a (104a and 105a) in the second state and the bias B2(t) of the angular velocity sensor 103b (104b and 105b) is negligible (constant), it can be assumed that Equation (13) and Equation (14) hold.

$$\int_{t1}^{t2} = B1(t)dt = \int_{t4}^{t5} = B1(t)dt = B1 * T \quad \text{Equation (13)}$$

$$\int_{t1}^{t2} B2(t)dt = \int_{t4}^{t5} = B2(t)dt = B2 * T \quad \text{Equation (14)}$$

However, B1 is the bias value of the angular velocity sensor 103a (104a and 105a) in the second state in the first period and the second period, and B2 is the bias value of the angular velocity sensors 103b (104b and 105b) in the first period and the second period.

Therefore, Equation (15) is derived from Equation (12).

$$I1 - I2 = 2 * B1 * T \quad \text{Equation (15)}$$

Since T is known, the bias value B1 of the angular velocity sensor 103a (104a and 105a) in the second state is calculated by dividing (I1-I2) by 2T. The calculated bias value B1 is used for angular velocity detection by the angular velocity sensor 103a (104a and 105a) in the second state. For example, the bias value B1 is used as an observation update of the Kalman filter.

Note that, the relationship between Equation (13) and Equation (14) may be established in the period during which the control is performed for interchanging the function of the primary side control circuit 12 and the function of the secondary side control circuit 13 in the angular velocity sensor 103b (104b and 105b) and the angular velocity is measured to calculate the bias value B1. Therefore, for example, even when a time interval (t6–t5) up to time t6, which is the start point of a next process, is large and B1 changes, similarly, correction is possible by the process from the next time t6. However, it is always preferable to make the time interval (t6–t5) sufficiently small in order to reduce the change in B1.

(Timing of Interchanging Function of Primary Side Control Circuit and Function of Secondary Side Control Circuit)

Here, in the present embodiment, the control unit 101 is configured so that, when the angular velocity is detected by any one of the angular velocity sensors 103a, 103b, 104a, 104b, 105a, and 105b in both the first state and the second state, the control unit 101 does not interchange the function of the primary side control circuit 12 and the function of the secondary side control circuit 13 by the other of the angular velocity sensors of the angular velocity sensors 103a, 103b, 104a, 104b, 105a, and 105b.

Equation (12)

Specifically, the control unit 101 is configured so that, when the angular velocity to be used for the operation before and after interchanging the function as the primary side control circuit 12 and the function as the secondary side control circuit 13 is detected by any of the angular velocity sensors 103a, 103b, 104a, 104b, 105a, and 105b, the control unit 101 does not perform the control for interchanging the function of the primary side control circuit 12 and the function of the secondary side control circuit 13 by the other of the angular velocity sensor of the angular velocity sensors 103a, 103b, 104a, 104b, 105a, and 105b.

Here, when the power is supplied from the power supply unit 102 and the angular velocity sensor 103a (103b, 104a, 104b, 105a, 105b) is driven, the angular velocity is always detected and a signal based on the detected angular velocity is output. The control unit 101 is configured to operate the angular velocity, the attitude angle, and the azimuth angle based on the signal output from the angular velocity sensor 103a (103b, 104a, 104b, 105a, and 105b). Further, the control unit 101 is configured to perform an operation of calculating the bias component of the angular velocity sensor 103a (103b, 104a, 104b, 105a, and 105b) based on the signal output from the angular velocity sensor 103a (103b, 104a, 104b, 105a, and 105b). When the function of the primary side control circuit 12 and the function of the secondary side control circuit 13 are interchanged by the angular velocity sensor 103a (103b, 104a, 104b, 105a, and 105b), the control unit 101 does not use the angular velocity detected by the other angular velocity sensor 103a (103b, 104a, 104b, 105a, and 105b) for the operation.

Further, the control unit 101 is configured to perform an operation of cancelling the bias component of the angular velocity detected by the angular velocity sensor 103a (103b, 104a, 104b, 105a, and 105b) based on the angular velocity detection result, in which the secondary vibration of the vibrator 11 is detected by the secondary side control circuit 13 in the angular velocity sensor 103a (103b, 104a, 104b, 105a, and 105b) and the angular velocity detection result, in which the secondary vibration of the vibrator 11 is detected by the primary side control circuit 12 by interchanging the function of the primary side control circuit 12 and the function of the secondary side control circuit 13 in the angular velocity sensor 103a (103b, 104a, 104b, 105a, and 105b).

For example, the control unit 101 detects (acquires) the angular velocity at which the secondary vibration of the vibrator 11 is detected by the secondary side control circuit 13 in the angular velocity sensor 103a in the period from time t11 to time t12 in FIG. 12(A). Further, the control unit 101 detects (acquires) the angular velocity at which the secondary vibration of the vibrator 11 is detected by the primary side control circuit 12 in the angular velocity sensor 103a in the period from time t14 to time t15 in FIG. 12(A). Then, the control unit 101 calculates the bias component of the angular velocity sensor 103a based on the angular velocity acquired in the period from time t11 to time t12 and the angular velocity acquired in the period from time t14 to time t15.

Further, for example, the control unit 101 acquires the angular velocity at which the secondary vibration of the vibrator 11 is detected by the secondary side control circuit 13 in the angular velocity sensor 104a for the operation in the period from time t21 to time t22 in FIG. 12(B). Further, the control unit 101 acquires the angular velocity, at which the secondary vibration of the vibrator 11 is detected by the primary side control circuit 12 in the angular velocity sensor 104a for the operation, in the period from time t24 to time t25 in FIG. 12(B). Then, the control unit 101 calculates (operates) the bias component of the angular velocity sensor 104a based on the angular velocity acquired in the period from time t21 to time t22 and the angular velocity acquired in the period from time t24 to time t25.

Further, for example, the control unit 101 acquires the angular velocity at which the secondary vibration of the vibrator 11 is detected by the secondary side control circuit 13 in the angular velocity sensor 105a for the operation in the period from time t31 to time t32 in FIG. 12(C). Further, the control unit 101 acquires the angular velocity at which the secondary vibration of the vibrator 11 is detected by the primary side control circuit 12 in the angular velocity sensor 105a for the operation in the period from time t34 to time t35 in FIG. 12(C). Then, the control unit 101 calculates (operates) the bias component of the angular velocity sensor 105a based on the angular velocity acquired in the period from time t31 to time t32 and the angular velocity acquired in the period from time t34 to time t35. Note that, although detailed description is omitted, the same applies to the angular velocity sensors 103b, 104b, and 105b.

Further, the control unit 101 is configured to interrupt the detection of the angular velocity to cancel the bias component of the angular velocity of the angular velocity sensor 103a (103b, 104a, 104b, 105a, and 105b) in a predetermined period before and after interchanging the function of the primary side control circuit 12 and the function of the secondary side control circuit 13 in the angular velocity sensor 103a (103b, 104a, 104b, 105a, and 105b). For example, in the predetermined period of FIG. 12(A) (period from time t12 to time t14) before and after a timing (time t13) of interchanging the function of the primary side control circuit 12 and the function of the secondary side control circuit 13 in the angular velocity sensor 103a, the control unit 101 interrupts the detection (acquisition for the operation) of the angular velocity to cancel the bias components of the angular velocities of the angular velocity sensors 103b, 104a, 104b, 105a, and 105b. Further, for example, in the predetermined period of FIG. 12(B) (period from time t22 to time t24) before and after a timing (time t23) of interchanging the function of the primary side control circuit 12 and the function of the secondary side control circuit 13 in the angular velocity sensor 104a, the control unit 101 interrupts the detection (acquisition for the operation) of the angular velocity to cancel the bias components of the angular velocities of the angular velocity sensors 103a, 103b, 104b, 105a, and 105b. Further, for example, in the predetermined period of FIG. 12(C) (period from time t32 to time t34) before and after a timing (time t33) of interchanging the function of the primary side control circuit 12 and the function of the secondary side control circuit 13 in the angular velocity sensor 105a, the control unit 101 interrupts the detection (acquisition for the operation) of the angular velocity to cancel the bias components of the angular velocities of the angular velocity sensors 103a, 103b, 104a, 104b, and 105b.

Further, the control unit 101 is configured so that, in a predetermined period before and after interchanging the function of the primary side control circuit 12 and the function of the secondary side control circuit 13 in any one of the angular velocity sensors 103a, 103b, 104a, 104b, 105a, and 105b, the control unit 101 performs control for interchanging the function of the primary side control circuit 12 and the function of the secondary side control circuit 13 in the other of the angular velocity sensors 103a, 103b, 104a, 104b, 105a, and 105b. For example, the control unit 101 interchanges the function of the primary side control circuit 12 and the function of the secondary side control circuit 13 in the angular velocity sensors 103b, 104a, 104b, 105a, and 105b in the predetermined period (in the period of time t12 to time t14) before and after the timing (time t13) of interchanging the function of the primary side control circuit 12 and the function of the secondary side control circuit 13 in the angular velocity sensor 103a of FIG. 12(A). Further, for example, the control unit 101 interchanges the function of the primary side control circuit 12 and the function of the secondary side control circuit 13 in the angular velocity sensors 103a, 103b, 104b, 105a, and 105b in the predetermined period (the period from time t22 to time t24) before and after the timing (time t23) of interchanging the function of the primary side control circuit 12 and the function of the secondary side control circuit 13 in the angular velocity sensor 104a of FIG. 12(B). Further, for example, the control unit 101 interchanges the function of the primary side control circuit 12 and the function of the secondary side control circuit 13 in the angular velocity sensors 103a, 103b, 104a, 104b, and 105b in the predetermined period (in the period from time t32 to time t34) before and after the timing (time t33) of interchanging the function of the primary side control circuit 12 and the function of the secondary side control circuit 13 in the angular velocity sensor 105a of FIG. 12(C).

Preferably, the control unit 101 is configured to approximately simultaneously interchange the function of the primary side control circuit 12 and the function of the secondary side control circuit 13 in the angular velocity sensors 103a, 103b, 104a, 104b, 105a, and 105b. That is, the control unit 101 interchanges the function of the primary side control circuit 12 and the function of the secondary side control circuit 13 in the angular velocity sensors 103a, 103b, 104a, 104b, 105a, and 105b while setting the time t13 in FIG. 12(A), time t23 in FIG. 12(B), and time t33 in FIG. 12(C) as the same timing.

Effect of Present Embodiment

In the present embodiment, the following effects can be obtained.

In the present embodiment, as described above, the control unit 101 is configured to perform control for switching the state of the angular velocity sensor 103a (104a and 105a) between the first state in which the angular velocity is detected by interchanging the function of the primary side control circuit 12 and the function of the secondary side control circuit 13, and the second state in which the angular velocity is detected without the function of the primary side control circuit 12 and the function of the secondary side control circuit 13 being interchanged. As a result, when the angular velocity in the stationary state is detected, it is possible to switch the state of the angular velocity sensor 103a (104a and 105a) to the first state by the control unit 101. As a result, in the first state, it is possible to detect the angular velocity in the stationary state by interchanging the function of the primary side control circuit 12 and the function of the secondary side control circuit 13, so that it is possible to detect the angular velocity while cancelling the bias component of the angular velocity sensor 103a (104a and 105a). As a result, it is possible to accurately detect the angular velocity in the stationary state. When detecting the angular velocity in the motion state, it is possible to switch the state of the angular velocity sensor 103a (104a and 105a) to the second state by the control unit 101. As a result, in the second state, it is possible to detect the angular velocity in the motion state without the function of the primary side control circuit 12 and the function of the secondary side control circuit 13 being interchanged, so that it is possible to prevent the inconvenience in which it is not possible to detect the angular velocity at the timing of interchanging the function of the primary side control circuit 12 and the function of the secondary side control circuit 13. As a result, it is possible to prevent the detection of the angular velocity from becoming intermittent. Therefore, even when using the angular velocity sensor 103a (104a and 105a) in which the function of the primary side control circuit 12 and the function of the secondary side control circuit 13 are interchangeable, it is possible to accurately (continuously) detect the angular velocity in the motion state. As a result, even when using the angular velocity sensor 103a (104a and 105a) in which the function of the primary side control circuit 12 and the function of the secondary side control circuit 13 are interchangeable, it is possible to accurately detect both the angular velocity in the stationary state and the angular velocity in the motion state.

Further, in the present embodiment, as described above, the angular velocity sensor 103a (103b, 104a, 104b, 105a, and 105b) is configured to include the plurality of switch elements 41 to 44. Further, the control unit 101 is configured to perform control for interchanging the function of the primary side control circuit 12 and the function of the secondary side control circuit 13 by the switching operation of the plurality of switch elements 41 to 44 in the first state, and not interchanging the function of the primary side control circuit 12 and the function of the secondary side control circuit 13 by not performing the switching operation of the plurality of switch elements 41 to 44 in the second state. As a result, it is possible to switch the state of the angular velocity sensor 103a (103b, 104a, 104b, 105a, and 105b) between the first state and the second state by simply controlling the switching operation of the plurality of switch elements 41 to 44. Therefore, it is possible to simply control the state of the angular velocity sensor 103a (103b, 104a, 104b, 105a, and 105b) by the control unit 101.

Further, in the present embodiment, as described above, the control unit 101 is configured to perform control for switching the detection range and the frequency band of the angular velocity sensor 103a (103b, 104a, 104b, 105a, and 105b) in the stationary state and the motion state. Here, the required detection range and frequency band are different between the case of detecting the angular velocity in the stationary state and the case of detecting the angular velocity in the motion state. Specifically, when detecting the angular velocity in the stationary state, a small detection range and a small frequency band are required in order to reduce noise. Further, when detecting the angular velocity in the motion state, the detected angular velocity is large and the change is rapid, so that a large detection range and a large frequency band are required. Therefore, as described above, when the detection range and the frequency band of the angular velocity sensor 103a (103b, 104a, 104b, 105a, and 105b) are switched in the stationary state and the motion state, it is possible to switch the detection range and the frequency band between the state in which the angular velocity is detected in the stationary state and the state in which the angular velocity is detected in the motion state, so that it is possible to more accurately detect both the angular velocity in the stationary state and the angular velocity in the motion state.

Further, in the present embodiment, as described above, the secondary side control circuit 13 is configured to have the drive circuit 36 that constitutes the closed control loop and includes the amplifier circuit 36a and the amplifier circuit 37 that amplifies the output from the closed control loop. Further, the control unit 101 is configured to perform control for switching the detection range and the frequency band of the angular velocity sensor 103a (103b, 104a, 104b, 105a, and 105b) by switching the amplification rate of the amplifier circuit 36a out of the amplifier circuit 36a and the amplifier circuit 37 in the stationary state and the motion state. Here, the S/N ratio of the output of the angular velocity sensor 103a (103b, 104a, 104b, 105a, and 105b) is basically determined based on the signal and noise generated in the closed control loop and the input noise generated in the amplifier circuit 37. In this case, when the detection range and the frequency band of the angular velocity sensor 103a (104a and 105a) are switched by switching the gain of the amplifier circuit 37, the ratio of the signal and noise generated in the closed control loop to the input noise generated in the amplifier circuit 37 does not change, so that the S/N ratio of the output of the angular velocity sensor 103a (103b, 104a, 104b, 105a, and 105b) does not change. On the other hand, as described above, when switching the detection range and the frequency band of the angular velocity sensor 103a (103b, 104a, 104b, 105a, and 105b) by switching the amplification rate of the amplifier circuit 36a of the amplifier circuit 36a and the amplifier circuit 37, it is possible to change the signal and noise generated in the closed control loop unlike the case of switching the amplification rate of the amplifier circuit 37. Therefore, when the signal and noise generated in the closed control loop are increased, it is possible to make the input noise generated in the amplifier circuit 37 relatively small with respect to the signal and noise generated in the closed control loop. As a result, it is possible to switch the detection range and the frequency band of the angular velocity sensor 103a (103b, 104a, 104b, 105a, and 105b) while improving the S/N ratio of the output of the angular velocity sensor 103a (103b, 104a, 104b, 105a, and 105b).

Further, in the present embodiment, as described above, the control unit 101 is configured to perform control for switching the offset value for correcting the fluctuation of the sensor output due to temperature change between the first state and the second state. Here, as described above, the appropriate offset value differs between the case where the function of the primary side control circuit 12 and the function of the secondary side control circuit 13 are interchanged and the case where the function of the primary side control circuit 12 and the function of the secondary side control circuit 13 are not interchanged. Therefore, as described above, when the offset value for correcting the fluctuation of the sensor output due to the temperature change is switched between the first state and the second state, it is possible to switch the offset value for correcting the fluctuation of the sensor output due to the temperature change between the first state in which the function of the primary side control circuit 12 and the function of the secondary side control circuit 13 are interchanged and the second state in which the function of the primary side control circuit 12 and the function of the secondary side control circuit 13 are not interchanged, so that it is possible to accurately correct the fluctuation of the sensor output due to the temperature change in both the first state and the second state. As a result, it is possible to more accurately detect both the angular velocity in the stationary state and the angular velocity in the motion state.

Further, in the present embodiment, as described above, in the second state, the control unit 101 is configured to perform control for detecting the angular velocity without the function of the primary side control circuit 12 and the function of the secondary side control circuit 13 in the angular velocity sensor 103a (104a and 105a) being interchanged in the predetermined period, detecting the angular velocity by interchanging the function of the primary side control circuit 12 and the function of the secondary side control circuit 13 in the angular velocity sensor 103b (104b and 105b), and acquiring the bias component of the angular velocity sensor 103a (104a and 105a) based on the angular velocity detection result by the angular velocity sensor 103a (104a and 105a) and the angular velocity detection result by the angular velocity sensor 103b (104b and 105b). As a result, the function of the primary side control circuit 12 and the function of the secondary side control circuit 13 are not interchanged. Therefore, even in a case of the angular velocity sensor 103a (104a and 105a) in the second state in which it is not possible to obtain the effect of cancelling the bias component by interchanging the functions, it is possible to acquire and cancel the bias component using the angular velocity sensor 103b (104b and 105b). As a result, it is possible to more accurately detect the angular velocity in the motion state.

Further, in the present embodiment, as described above, the control unit 101 is configured so that, when the angular velocity is detected by any of the angular velocity sensors 103a, 103b, 104a, 104b, 105a, and 105b in both the first state and the second state, the control unit 101 does not interchange the function of the primary side control circuit 12 and the function of the secondary side control circuit 13 by the other of the angular velocity sensors of the angular velocity sensors 103a, 103b, 104a, 104b, 105a, and 105b. Here, when the function of the primary side control circuit 12 and the function of the secondary side control circuit 13 are interchanged, the current consumption of the angular velocity sensor fluctuates greatly from the steady state, so that there is a case where the output of the angular velocity sensor connected to the common power supply unit 102 is influenced. Therefore, as described above, when the angular velocity is detected by any of the angular velocity sensors 103a, 103b, 104a, 104b, 105a, and 105b and the function of the primary side control circuit 12 and the function of the secondary side control circuit 13 are not interchanged by the other of the angular velocity sensors of the angular velocity sensors 103a, 103b, 104a, 104b, 105a, and 105b, it is possible to prevent the outputs of the angular velocity sensors 103a, 103b, 104a, 104b, 105a, and 105b connected to the common power supply unit 102 from being influenced due to the interchange of the function of the primary side control circuit 12 and the function of the secondary side control circuit 13.

Further, in the present embodiment, as described above, the azimuth/attitude angle measuring device 100 is configured to function as a gyro compass in the first state in a stationary state and function as an inertial navigation device in the second state in a motion state. As a result, it is possible to cause the azimuth/attitude angle measuring device 100 of the present embodiment to easily function as the gyro compass and the inertial navigation device. Therefore, it is possible to use the azimuth/attitude angle measuring device 100 for the purpose of both the gyro compass and the inertial navigation device.

Further, in the present embodiment, as described above, the vibrator 11 is configured to include the ring-type vibrator 11. Here, since the ring-type vibrator 11 has a symmetrical shape, a vibration mode by the primary side control circuit 12 and a vibration mode by the secondary side control circuit 13 are similar. Therefore, by providing the ring-type vibrators in the angular velocity sensors 103a, 103b, 104a, 104b, 105a, and 105b of the azimuth/attitude angle measuring device 100, it is not necessary to consider the effect of the difference in vibration modes.

Modification Example

Note that, it should be noted that the embodiments disclosed this time are exemplary in all aspects and are not restrictive. The scope of the present invention is shown by the claims rather than the description of the embodiment described above, and further includes all modifications (modification examples) within the meaning and scope equivalent to the claims.

For example, in the embodiment, an example in which the ring-type vibrator is used is shown, but the present invention is not limited thereto. For example, the vibrator may have a symmetrical shape, and a vibrator having a disk type, a cup type (wine glass type), an octagonal type, or the like may be used.

Further, in the embodiment, an example in which the closed control loop is configured by the vibrator, the amplifier circuit, the synchronous detection circuit, the loop filter, the modulation circuit, and the drive circuit is shown, but the present invention is not limited thereto. For example, the control loop may be configured by a configuration other than the configuration consisting of the amplifier circuit, the synchronous detection circuit, the loop filter, the modulation circuit, and the drive circuit.

Further, in the embodiment, an example in which an integral filter is used as the loop filter is shown, but, for example, a loop filter other than the integral filter may be used.

Further, in the embodiment, an example is shown in which both the detection range and the frequency band of the angular velocity sensor (first angular velocity sensor) are switched between the first state and the second state. However, in the present invention, only one of the detection range and the frequency band of the first angular velocity sensor may be switched between the first state and the second state by the control unit.

Further, in the embodiment, an example is shown in which the detection range and the frequency band of the angular velocity sensor (first angular velocity sensor) are switched by switching the amplification rate of the amplifier circuit of the drive circuit in the amplifier circuit (first amplifier circuit) of the drive circuit and the amplifier circuit (second amplifier circuit) that amplifies the output from the closed control loop. However, in the present invention, the control unit switches the amplification rate of the second amplifier circuit of the first amplifier circuit and the second amplifier circuit, so that the detection range and the frequency band of the first angular velocity sensor may be switched.

Further, in the embodiment, an example is shown in which the offset value for correcting the fluctuation of the sensor output due to the temperature change is switched between the first state and the second state. However, in the present invention, in the first state and the second state, it is not always necessary to switch the offset value for correcting the fluctuation of the sensor output due to the temperature change. For example, the offset value in the second state of the embodiment may be used as the offset value in the first state. However, from the viewpoint of the accuracy of correction, it is preferable that the offset value for correcting the fluctuation of the sensor output due to the temperature change is switched.

Further, in the embodiment, an example is shown in which the first offset value before interchange is a1+b1 and the second offset value is a2+b2, and the first offset value after interchange is −a1+b1 and the second offset value is −a2+b2. However, the present invention is not limited thereto. For example, the first offset value before interchange may be a1 and the second offset value may be a2, and the first offset value after interchange may be −a1 in which the polarity of the first offset value a1 before interchange is reversed and the second offset value after interchange may be −a2 in which the polarity of the second offset value a2 before interchange is reversed. As a result, before and after the function as the primary side control circuit 12 and the function as the secondary side control circuit 13 are interchanged, some residue of the temperature fluctuation component of the bias remains. However, the first offset value for performing the correction inversely proportional to the square of the gain of the vibrator 1 and the second offset value for performing the correction inversely proportional to the first power of the gain of the vibrator 1 are symmetrical with respect to zero (predetermined reference value), so that it is possible to suppress the symmetry of the control of the vibration-type angular velocity sensor before and after interchange from being broken.

Further, in the embodiment, an example is shown in which the first offset value before interchange is a1+b1 and the second offset value is a2+b2, and the first offset value after interchange is −a1+b1 and the second offset value is −a2+b2. However, the present invention is not limited thereto. For example, a configuration may be made so that the median value is determined to cancel the first term of Equation (1) (that is, the first offset value is fixed to b1), the second offset value before interchange is a2+b2, the second offset value after interchange may be −a2+b2 That is, only the second offset value may be a symmetric value with respect to a predetermined reference value before and after interchange.

Further, in the embodiment, an example is shown in which the first temporary offset value a1 and the second temporary offset value a2 before and after interchange are determined so that the residue of the bias component becomes the smallest before and after interchange. However, the present invention is not limited thereto. For example, the first offset value and the second offset value before and after interchange may be determined so that the residue of the bias component becomes a value in the vicinity of the smallest value before and after interchange.

Further, in the embodiment, an example is shown in which the addition-subtraction amount adjusting circuits 4a and 4b and the addition-subtraction amount adjusting circuits 5a and 5b (four individual circuits) are provided so as to output the offset value a +b and the offset value −a +b. However, the present invention is not limited thereto. In the present invention, a circuit that outputs a signal corresponding to the offset value a +b and the offset value −a +b may be provided.

Further, in the embodiment, an example of a configuration is shown in which a plurality of angular velocity sensors that detect the angular velocities around the three axes of the X axis, the Y axis, and the Z axis orthogonal to each other are provided. However, the present invention is not limited thereto. In the present invention, a plurality of angular velocity sensors that detect the angular velocities around two axes in different directions may be provided, and further, a plurality of angular velocity sensors that detect the angular velocities around three or more axes in different directions may be provided. Further, the axes of the angular velocities detected by the plurality of angular velocity sensors may be in different directions that are not orthogonal to each other.

Further, in the embodiment, an example of a configuration is shown in which two angular velocity sensors that detect the angular velocities around parallel axes are provided. However, the present invention is not limited thereto. In the present invention, three or more angular velocity sensors that detect the angular velocities around parallel axes may be provided, or a plurality of angular velocity sensors may be provided for some of the axes and one angular velocity sensor may be provided for the other axes.

Further, in the embodiment, an example is shown in which the control unit is configured to perform control for detecting the angular velocity without the function of the primary side control circuit and the function of the secondary side control circuit in the first angular velocity sensor being interchanged in the predetermined period in the second state, detecting the angular velocity by interchanging the function of the primary side control circuit and the function of the secondary side control circuit in the second angular velocity sensor, and acquiring the bias component of the first angular velocity sensor based on the angular velocity detection result by the first angular velocity sensor and the angular velocity detection result by the second angular velocity sensor. However, the present invention is not limited thereto. In the present invention, the control unit may be configured to perform control for detecting the angular velocity by interchanging the function of the primary side control circuit and the function of the secondary side control circuit in the first angular velocity sensor in the predetermined period in the first state, detecting the angular velocity without the function of the primary side control circuit and the function of the secondary side control circuit in the second angular velocity sensor being interchanged, and acquiring the bias component of the second angular velocity sensor based on the angular velocity detection result by the first angular velocity sensor and the angular velocity detection result by the second angular velocity sensor. With this configuration, the function of the primary side control circuit and the function of the secondary side control circuit are not interchanged. Therefore, even in a case of the second angular velocity sensor in which it is not possible to obtain the effect of cancelling the bias component by interchanging the functions, it is possible to acquire and cancel the bias component using the first angular velocity sensor. As a result, it is possible to more accurately detect the angular velocity in the motion state. Further, in this case, the second angular velocity sensor may not have a function of interchanging the function of the primary side control circuit and the function of the secondary side control circuit.

REFERENCE SIGNS LIST

11 Vibrator
12 Primary side control circuit
13 Secondary side control circuit
36 Drive circuit
36a Amplifier circuit (first amplifier circuit)
37 Amplifier circuit (second amplifier circuit)
41~44 Switch element
100 Azimuth/attitude angle measuring device
101 Control unit
102 Power supply unit
103a Angular velocity sensor (first angular velocity sensor)
103b Angular velocity sensor (second angular velocity sensor)
104a Angular velocity sensor (third angular velocity sensor)
105a Angular velocity sensor (third angular velocity sensor)

The invention claimed is:
1. An azimuth/attitude angle measuring device comprising:
a first angular velocity sensor; and
a control unit, wherein
the first angular velocity sensor includes
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator,
the primary side control circuit and the secondary side control circuit are configured so that a function as the primary side control circuit and a function as the secondary side control circuit are interchangeable, and
the control unit is configured to perform control for switching a state of the first angular velocity sensor between a first state in which the angular velocity is detected while repeatedly interchanging the function of the primary side control circuit and the function of the secondary side control circuit and a second state in which the angular velocity is detected without the function of the primary side control circuit and the function of the secondary side control circuit being interchanged.
2. The azimuth/attitude angle measuring device according to claim 1, wherein
the first angular velocity sensor further includes a plurality of switch elements, and
the control unit is configured to perform control for interchanging the function of the primary side control circuit and the function of the secondary side control circuit by an operation of switching the plurality of switch elements in the first state, and not interchanging the function of the primary side control circuit and the function of the secondary side control circuit by not performing the operation of switching the plurality of switch elements in the second state.
3. The azimuth/attitude angle measuring device according to claim 1, wherein
the control unit is configured to perform control for switching at least one of a detection range and a frequency band of the first angular velocity sensor in a stationary state and a motion state.
4. The azimuth/attitude angle measuring device according to claim 3, wherein
the secondary side control circuit has a drive circuit that constitutes the closed control loop and includes a first amplifier circuit and a second amplifier circuit that amplifies the output from the closed control loop, and
the control unit is configured to perform control for switching the detection range and the frequency band of the first angular velocity sensor by switching an amplification rate of the first amplifier circuit out of the first amplifier circuit and the second amplifier circuit in the stationary state and the motion state.
5. The azimuth/attitude angle measuring device according to claim 1, wherein
the control unit is configured to perform control for switching an offset value for correcting fluctuation of a sensor output due to a temperature change in the first state and the second state.

6. The azimuth/attitude angle measuring device according to claim 1, further comprising:

a second angular velocity sensor that includes the vibrator, the primary side control circuit, and the secondary side control circuit, wherein the control unit is configured to perform control for, in the second state, detecting the angular velocity without the function of the primary side control circuit and the function of the secondary side control circuit in the first angular velocity sensor being interchanged in a predetermined period, detecting the angular velocity while repeatedly interchanging the function of the primary side control circuit and the function of the secondary side control circuit in the second angular velocity sensor, and acquiring a bias component of the first angular velocity sensor based on an angular velocity detection result by the first angular velocity sensor and an angular velocity detection result by the second angular velocity sensor.

7. The azimuth/attitude angle measuring device according to claim 1, further comprising:

a second angular velocity sensor that includes the vibrator, the primary side control circuit, and the secondary side control circuit, wherein the control unit is configured to perform control for, in the first state, detecting the angular velocity while repeatedly interchanging the function of the primary side control circuit and the function of the secondary side control circuit in the first angular velocity sensor in a predetermined period, detecting the angular velocity without the function of the primary side control circuit and the function of the secondary side control circuit in the second angular velocity sensor being interchanged, and acquiring a bias component of the second angular velocity sensor based on an angular velocity detection result by the first angular velocity sensor and an angular velocity detection result by the second angular velocity sensor.

8. The azimuth/attitude angle measuring device according to claim 1, further comprising:

a third angular velocity sensor that includes the vibrator, the primary side control circuit, and the secondary side control circuit; and a power supply unit that supplies power to the first angular velocity sensor and the third angular velocity sensor, wherein the control unit is configured so that, when the angular velocity for an operation is detected by one of the first angular velocity sensor and the third angular velocity sensor in both the first state and the second state, the control unit does not interchange the function of the primary side control circuit and the function of the secondary side control circuit in the other of the first angular velocity sensor and the third angular velocity sensor.

9. The azimuth/attitude angle measuring device according to claim 1, wherein the azimuth/attitude angle measuring device is configured to function as a gyro compass in the first state and function as an inertial navigation device in the second state.

10. An azimuth/attitude angle measuring device comprising:

a first angular velocity sensor; and a control unit, wherein the first angular velocity sensor includes a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, the first angular velocity sensor is configured so that a function of inducing the primary vibration and a function of detecting the secondary vibration are interchangeable, and the control unit is configured to perform control for switching a state of the first angular velocity sensor between a first state in which the angular velocity is detected while repeatedly interchanging the function of inducing the primary vibration and the function of detecting the secondary vibration and a second state in which the angular velocity is detected without the function of inducing the primary vibration and the function of detecting the secondary vibration being interchanged.

11. The azimuth/attitude angle measuring device according to claim 10, wherein the first angular velocity sensor further includes a plurality of switch elements, and the control unit is configured to perform control for interchanging the function of inducing the primary vibration and the function of detecting the secondary vibration by an operation of switching the plurality of switch elements in the first state, and not interchanging the function of inducing the primary vibration and the function of detecting the secondary vibration by not performing the operation of switching the plurality of switch elements in the second state.

12. The azimuth/attitude angle measuring device according to claim 10, wherein the control unit is configured to perform control for switching at least one of a detection range and a frequency band of the first angular velocity sensor in a stationary state and a motion state.

13. The azimuth/attitude angle measuring device according to claim 12, wherein the secondary side control circuit has a drive circuit that constitutes the closed control loop and includes a first amplifier circuit and a second amplifier circuit that amplifies the output from the closed control loop, and the control unit is configured to perform control for switching the detection range and the frequency band of the first angular velocity sensor by switching an amplification rate of the first amplifier circuit out of the first amplifier circuit and the second amplifier circuit in the stationary state and the motion state.

14. The azimuth/attitude angle measuring device according to claim 10, wherein the control unit is configured to perform control for switching an offset value for correcting fluctuation of a sensor output due to a temperature change in the first state and the second state.

15. The azimuth/attitude angle measuring device according to claim 10, further comprising:
  a second angular velocity sensor that includes the vibrator, the primary side control circuit, and the secondary side control circuit, wherein
  the control unit is configured to perform control for, in the second state, detecting the angular velocity without the function of inducing the primary vibration of the first angular velocity sensor and the function of detecting the secondary vibration in the first angular velocity sensor being interchanged in a predetermined period, detecting the angular velocity while repeatedly interchanging the function of inducing the primary vibration and the function of detecting the secondary vibration in the second angular velocity sensor, and acquiring a bias component of the first angular velocity sensor based on an angular velocity detection result by the first angular velocity sensor and an angular velocity detection result by the second angular velocity sensor.

16. The azimuth/attitude angle measuring device according to claim 10, further comprising:
  a second angular velocity sensor that includes the vibrator, the primary side control circuit, and the secondary side control circuit, wherein
  the control unit is configured to perform control for, in the first state, detecting the angular velocity while repeatedly interchanging the function of inducing the primary vibration and the function of detecting the secondary vibration in the first angular velocity sensor in a predetermined period, detecting the angular velocity without the function of inducing the primary vibration and the function of detecting the secondary vibration in the second angular velocity sensor being interchanged, and acquiring a bias component of the second angular velocity sensor based on an angular velocity detection result by the first angular velocity sensor and an angular velocity detection result by the second angular velocity sensor.

17. The azimuth/attitude angle measuring device according to claim 10, further comprising:
  a third angular velocity sensor that includes the vibrator, the primary side control circuit, and the secondary side control circuit; and
  a power supply unit that supplies power to the first angular velocity sensor and the third angular velocity sensor, wherein
  the control unit is configured so that, when the angular velocity for an operation is detected by one of the first angular velocity sensor and the third angular velocity sensor in both the first state and the second state, the control unit does not interchange the function of inducing the primary vibration and the function of detecting the secondary vibration in the other of the first angular velocity sensor and the third angular velocity sensor.

18. The azimuth/attitude angle measuring device according to claim 10, wherein
  the azimuth/attitude angle measuring device is configured to function as a gyro compass in the first state and function as an inertial navigation device in the second state.

* * * * *